United States Patent
Uchigaki et al.

(10) Patent No.: US 6,219,614 B1
(45) Date of Patent: *Apr. 17, 2001

(54) NAVIGATION SYSTEM PROVIDING SIMPLIFIED NAVIGATION INSTRUCTIONS USING GRAPHICS AND VOICE GUIDANCE TO PREFERRED ROUTES AND USING LANDMARKS

(75) Inventors: Yuichiro Uchigaki; Teruki Akamatsu, both of Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,239

(22) PCT Filed: May 15, 1997

(86) PCT No.: PCT/JP97/01643

§ 371 Date: Oct. 15, 1998

§ 102(e) Date: Oct. 15, 1998

(87) PCT Pub. No.: WO98/51995

PCT Pub. Date: Nov. 19, 1998

(51) Int. Cl.[7] ............................................. G01C 21/00
(52) U.S. Cl. ...................... 701/211; 701/209; 340/995; 340/996
(58) Field of Search ................................ 701/209, 211, 701/201; 340/995, 996

(56) References Cited

U.S. PATENT DOCUMENTS

| | | | |
|---|---|---|---|
| 4,937,752 | * | 6/1990 | Nanba et al. ................... 701/208 |
| 5,323,321 | * | 6/1994 | Smith, Jr. ........................ 701/211 |
| 5,414,630 | * | 5/1995 | Oshizawa et al. ............... 701/211 |
| 5,442,557 | * | 8/1995 | Kaneko ........................... 701/213 |
| 5,729,109 | * | 3/1998 | Kaneko et al. .................. 318/587 |
| 5,799,264 | * | 8/1998 | Mizutani et al. ................. 701/211 |
| 5,839,086 | * | 11/1998 | Hirano ............................ 701/201 |
| 5,842,147 | * | 11/1998 | Nimura et al. ................... 701/211 |
| 5,902,349 | * | 5/1999 | Endo et al. ...................... 701/202 |
| 5,911,775 | * | 6/1999 | Tanimoto ......................... 701/210 |

FOREIGN PATENT DOCUMENTS

| | | |
|---|---|---|
| 58-199376 | 11/1983 | (JP) . |
| 4-190112 | 7/1992 | (JP) . |
| 5-34167 | 2/1993 | (JP) . |
| 5-46084 | 2/1993 | (JP) . |
| 5-88611 | 4/1993 | (JP) . |
| 5-93631 | 4/1993 | (JP) . |
| 5-297800 | 11/1993 | (JP) . |
| 5-313577 | 11/1993 | (JP) . |
| 6-12596 | 1/1994 | (JP) . |
| 7-44709 | 2/1995 | (JP) . |
| 7-44796 | 2/1995 | (JP) . |
| 7-139959 | 6/1995 | (JP) . |
| 8-261778 | 10/1996 | (JP) . |
| 8-304101 | 11/1996 | (JP) . |
| 9-53948 | 2/1997 | (JP) . |
| 9-90868 | 4/1997 | (JP) . |

* cited by examiner

*Primary Examiner*—Michael J. Zanelli
(74) *Attorney, Agent, or Firm*—Sughrue, Mion, Zinn, Macpeak & Seas, PLLC

(57) ABSTRACT

A navigation system comprises a map information storage device for storing map data, a route setting device for setting a route between two points on the map data, target intersection detecting device for detecting a target intersection on the route from the set route and the map data, present position detector for detecting the present position of a mobile body, quantization computing device for quantizing the set route into simple graphics, and display for displaying the quantized route on a stepwise basis according to the distance between the nearest target intersection and the present position. The navigation system is capable of reducing the amount of distraction posed to a vehicle driver, is highly versatile and reduces the cost of the system.

18 Claims, 25 Drawing Sheets

310

320

| | GUIDE CONDITION | VOICE MESSAGE |
|---|---|---|
| a | $L2 < L1$ | PROCEED ALONG THE ROAD OVER 1Km OR MORE |
| b | $L3 < L1 \leq L2$ | TURN TO THE RIGHT ABOUT 1Km AHEAD |
| c | $L1 \leq L3$ | TURN TO THE RIGHT SOON |

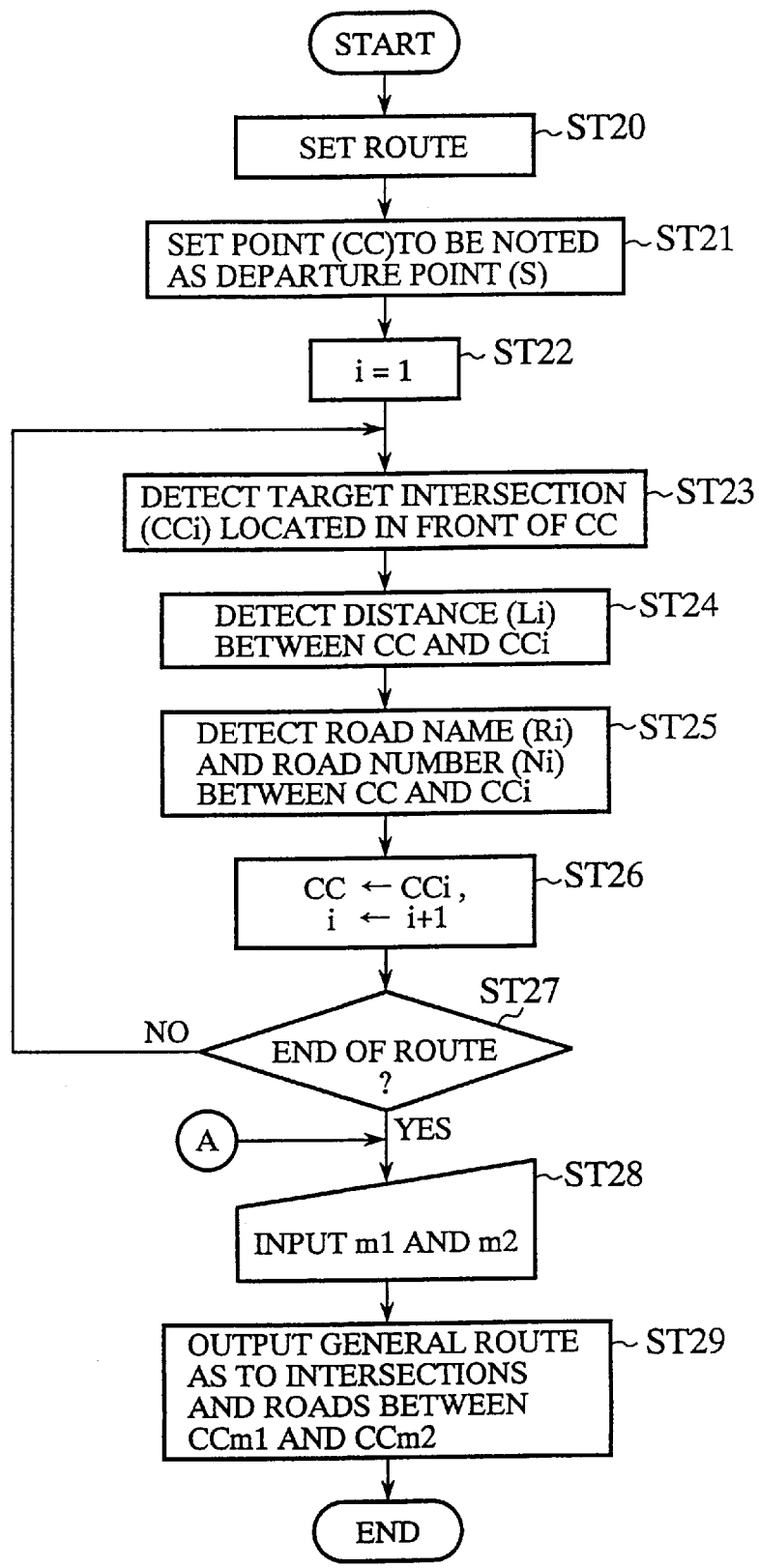

FIG.14

| TARGET OBJECT | VOICE MESSAGE |
|---|---|
| TARGET INTERSECTION | KUSAKABE INTERSECTION |
| ROAD BETWEEN TARGET INTERSECTIONS | NATIONAL ROAD NO. 176 |

421 / 422

| TRAVELING DIRECTION | VOICE MESSAGE |
|---|---|
| EAST | GO EAST |
| SOUTH | GO DOWN SOUTH |
| WEST | GO WEST |
| NORTH | GO UP NORTH |

423 / 424

GENERAL ROUTE NOTIFICATION MESSAGE — 425

DEPART FROM DEPARTURE POINT AND PROCEED ON NATIONAL ROAD NO. 176 TO SOUTH
TURN TO THE RIGHT AT TENJOHASHI INTERSECTION LOCATED ABOUT 5Km AHEAD
PROCEED ON PREFECTURAL ROAD NO. 82 TO WEST
TURN TO THE LEFT AT NISHINOMIYA NORTH INTERCHANGE GATE LOCATED ABOUT 500Km AHEAD AND PROCEED IN THE DIRECTION OF OSAKA ALONG CHUGOKU HIGHWAY

FIG.20

| ROUTE DIRECTION 431 | SECTOR MESSAGE 432 |
|---|---|
| TRAVELING DIRECTION | PARALLEL DRIVING |
| OPPOSITE DIRECTION | REVERSE DRIVING |
| RIGHT DIRECTION | EXTEND TO THE RIGHT |
| LEFT DIRECTION | EXTEND TO THE LEFT |

FIG.21

─ GUIDE MESSAGE ─ 433

- ROUTE DIRECTION IS IN RIGHT REAR POSITION ABOUT 100m AWAY
- ROUTE EXTENDS TO THE LEFT AT POSITION ABOUT 100m AHEAD
- MOBILE BODY IS PARALLEL DRIVING ON THE LEFT SIDE OF ROUTE ABOUT 30m

FIG.30

─ GUIDE MESSAGE ─ 441

- MOBILE BODY IS BEING PARALLEL-DRIVEN TO EAST AT POSITION LOCATED 100m SOUTH OF NATIONAL ROAD NO.2
- MOBILE BODY IS PROCEEDING SOUTHWARD AT POSITION LOCATED 300m NORTH OF WANGAN LINE NO.5 OF HANSHIN HIGHWAY
- MOBILE BODY IS PROCEEDING TO EAST ALONG ROAD JUST UNDER HANKYU-KOBE LINE
- MOBILE BODY IS PLACED AT POSITION LOCATED 50m SOUTH OF TOKYO TOWER

NAVIGATION SYSTEM PROVIDING SIMPLIFIED NAVIGATION INSTRUCTIONS USING GRAPHICS AND VOICE GUIDANCE TO PREFERRED ROUTES AND USING LANDMARKS

TECHNICAL FIELD

This invention relates to a navigation system mounted onto a mobile body and used to guide the movement of the mobile body.

BACKGROUND ART

FIG. 1 is an explanatory diagram showing a guide screen employed in a conventional navigation system disclosed in, for example, Japanese Patent Publication No. Hei 2-55796. In the drawing, reference numeral 1 indicates a screen display unit for displaying a guide screen thereon, and reference numeral 2 indicates a road map displayed on the screen display unit 1. Reference numeral 3 indicates the present position of a mobile body equipped with the navigation system, which is displayed so as to be superimposed on the road map 2, reference numeral 4 indicates the direction in which the mobile body is traveling, and reference numeral 5 indicates the locus of movement of the mobile body.

In the conventional navigation system as described above, the state of the mobile body, instructions for the direction to be guided, etc. are displayed by using the road map 2 and superimposing symbols or the like indicative of the route and the present position 3 of the mobile body on the road map 2. Hence a display screen for such guidance is displayed on the screen display unit 1. Thus, the road map 2 is necessary for the display of the guide screen and the display of the road map 2 has been used for all phases such as the setting of geographic points, the display of the present position, the display of a route, etc.

Since the conventional navigation system is constructed as described above, it has a problem in that information that is not necessarily required for actual driving is included and the guiding screen display is apt to become complex. Hence a great load is placed on a user to recognize the displayed contents.

Further, the present navigation system has another problem in that the size of the screen display unit 1 for displaying the guide screen is apt to increase to clearly display the road map 2 and thus it is hard to suitably install the system when the navigation system is placed in the mobile body.

Moreover, the present navigation system has a further problem in that since a system with high resolution is required to clearly display the road map 2 on the screen, the screen display unit 1 is apt to increase in cost, so that the cost of the entire system increases.

The present invention has been made to solve the above-described problems. An object of the present invention is to obtain a navigation system wherein a route is represented by a quantized bearing so as to simplify the entire screen without displaying a road map on the screen, thereby making it possible to reduce the load on the user as regards the recognition of the displayed contents.

Another object of the present invention is to obtain a navigation system wherein the need for the user to frequently observe a display screen is eliminated by guiding a route by voice.

A further object of the present invention is to obtain a navigation system wherein a road map is not displayed on the screen so as to relax restrictions on the size of the screen display unit, and the screen display unit is simplified to improve versatility of its installation place and allow a reduction in the cost of the entire system.

However, an additional problem arises in that since the user cannot utilize a map as a method for recognizing the present position when the road map is not displayed on the screen in this way, it is necessary to additionally provide means for recognizing the present position.

The present invention has been made to simultaneously solve such problems. An object of the present invention is to obtain a navigation system wherein facilities such as famous roads, railway lines, etc. located in the neighborhood of the mobile body are used to represent the present position thereof and are displayed in the form of a position relative to the present position, thereby making it possible to recognize the present position. The position can be given even by voice so as to ease the situation in which a user frequently views the display screen to recognize the present position.

DISCLOSURE OF THE INVENTION

This invention is constructed so as to set a route between two points by a route setting means by map data such as road data, intersection data or the like stored in map information storing means, detect a target intersection on the route by target intersection detecting means from the route set by the route setting means and the map data, detect the present position of the mobile body by a present position detecting means, quantize the route for the mobile body into simple graphics by the quantization computing means, and display the quantized route on the display means according to the distance relationship between the nearest target intersection and the present position of the mobile body. According to this construction, since the display of the route is made according to the bearing based on the quantized simple graphics and information that is not necessarily required in actual driving is omitted, the display of the entire screen becomes simple and hence a user is able to recognize the displayed contents on sight, whereby the load on route recognition is reduced. Further, since a road map is not displayed on the screen, restrictions on the size of a screen display unit are lightened and a simple screen display unit can be used. Thus, versatility as regards the installation can be improved and the cost of the entire system can be reduced.

The present invention is constructed so as to store words or phrases or the like necessary for a guide message as voice waveform data in a voice information storing means incorporated in voice message generating means. It then reads the voice waveform data for the corresponding guide message from the voice information storing means when a route for the corresponding mobile body, which is represented in simple graphics quantized by the quantization computing means, based on the relationship in distance between the nearest target intersection and the present position. The information then is displayed on display means, notified to a user even by voice through voice outputting means. According to this construction, the user is not required to frequently observe the display screen and can concentrate on the driving of the mobile body.

The present invention is constructed so as to store a program for performing a computing process in the quantization computing means in an external storage medium and read the program as needed to execute a quantization computation. According to this construction, the replacement of a faulty portion of the program for the quantization computing process by another and the upgrading of a version can be easily performed.

The present invention is constructed so as to set a route between two points by route setting means on map data stored in map information storing means, detect target intersections on the set route between the two points by target intersection detecting means, generate, by general route generating means, a general route in which the detected target intersections and the names of roads, numbers thereof, etc. between the intersections are arranged in list form, and display the general route on the display means. According to this construction, the entire state of a route can be displayed and a user can recognize at a route set stage in advance, along which route a user reaches the destination.

The present invention is constructed so as to store a program for performing a computing process in the general route generating means in an external storage medium and read it as needed to thereby generate a general route. According to this construction, the replacement of a faulty portion of the program used for the general route generating process by another and the upgrading of a version can be easily performed.

The present invention is constructed so as to store words or phrases or the like in a voice information storing means built in voice message generating means as voice waveform data. This data is necessary for messages for notifying the names of target intersections, right and left turns, road names, road numbers, the distance between the adjacent intersections, site frontage names, etc. by voice. When a general route in which target intersections, the names of roads lying therebetween and their numbers, etc. are arranged in list form, is generated by general route generating means, voice waveform data for a message corresponding to the general route is selected. The names of the target intersections and the roads therebetween, zone distances, traveling directions, etc. in route order are read out to notify the user of the generated general route by voice. According to this construction, a user is able to recognize the state of the route even without viewing the display screen of display means and hence can concentrate on his/her driving.

The present invention is constructed so as to detect an achievable distance extending from the present position of a mobile body to a route set by a route achievable distance detecting means and detect the set route when the present position of the mobile body is not on the route set by a route setting means. It displays the achievable distance on the display means together with the present position of the mobile body and a quantized route in the vicinity of the present position thereof. According to this construction, even when the present position of the mobile body is not on the route, the user can recognize by their senses whether the mobile body can follow the route, depending on in which direction and how far the mobile body moves.

The present invention is constructed so as to store a program for performing a computing process in the route achievable distance detecting means in an external storage medium and read it as needed to thereby detect a route achievable distance. According to this construction, the replacement of a faulty portion of the program for the route achievable distance detecting process by another and the upgrading of a version can be easily performed.

The present invention is constructed so as to store even words or phrases or the like necessary for a message for notifying the distance up to and direction toward a set route, etc. by voice in a voice information storing means incorporated in a voice message generating means as voice waveform data When the distance between the route and the present position of a mobile body and the direction from the route to the present position are detected, it selects voice waveform data for a message corresponding to the detected distance and direction by the route achievable distance detecting means, and notifies the distance and direction from the present position of the mobile body to the route by voice. According to this construction, when the present position of the mobile body is not on the set route, a user can recognize without viewing the display screen, whether the mobile body can follow the route, depending on which direction and how far the mobile body moves.

The present invention is constructed so as to retrieve, when the present position of a mobile body is not on a route set by a route setting means, a peripheral road lying between the corresponding route and the present position of the mobile body from map data stored in map information storing means by peripheral road retrieving means and display the road extending from the present position to the route on a display means. According to this construction, even when the mobile body has diverged from the set route, a user can easily recognize how the mobile body can reach the route from the present position thereof.

The present invention is constructed so as to store a program for performing a computing process in the peripheral road retrieving means in an external storage medium and read it as needed to thereby retrieve a peripheral road. According to this construction, the replacement of a faulty portion of the program used for the peripheral road retrieving process and the upgrading of a version can be easily performed.

The present invention is constructed so as to extract each already-known target lying around the present position of a mobile body from map data stored in the map information storing means by the peripheral target extracting means when the present position of the mobile body becomes unknown, and display the relationship between the target and the present position of the mobile body on the display means. According to this construction, even when the present position of the mobile body becomes unknown during driving, a user can easily recognize the present position as a relative position as viewed from the known target which exists on the periphery thereof.

The present invention is constructed so as to store a program for performing a computing process in a peripheral target extracting means in an external storage medium and read it as needed to thereby extract each already-known target. According to this construction, the replacement of a faulty portion of the program used for the peripheral target extracting process by another and the upgrading of a version can be easily performed.

The present invention is constructed so as to store even words or phrases or the like necessary for a message used for notifying by voice, the relationship between the present position of a mobile body and each already-known target existing therearound in voice information storing means incorporated in the voice message generating means as voice waveform data it selects, when the corresponding target is extracted by the peripheral target extracting means, voice waveform data for a message corresponding to the target and notify the relationship between the present position of the mobile body and each known target lying therearound by voice. According to this construction, when the present position of the mobile body is unknown, a user can recognize it as a relative position as viewed from the corresponding target without viewing the display screen.

BRIEF DESCRIPTION OF THE DRAWINGS

FIG. 11 is a flowchart showing the flow of the operation of the navigation system according to the embodiment 2 shown in FIG. 9;

FIG. 14 is an explanatory diagram showing one example of a voice message notified by voice outputting means employed in the embodiment 3 shown in FIG. 13;

FIG. 20 is an explanatory diagram showing one example of a partial message in a voice message notified by voice outputting means employed in the embodiment 5 shown in FIG. 19;

FIG. 21 is an explanatory diagram illustrating one example of a voice message notified by the voice outputting means employed in the embodiment 5 shown in FIG. 19;

FIG. 30 is an explanatory diagram showing one example of a voice message notified by voice outputting means employed in the embodiment 8 shown in FIG. 29.

BEST MODE FOR CARRYING OUT THE INVENTION

Best modes for carrying out the invention will hereinafter be explained in accordance with the accompanying drawings to describe this invention in more detail.

Embodiment 1

Figure 1:
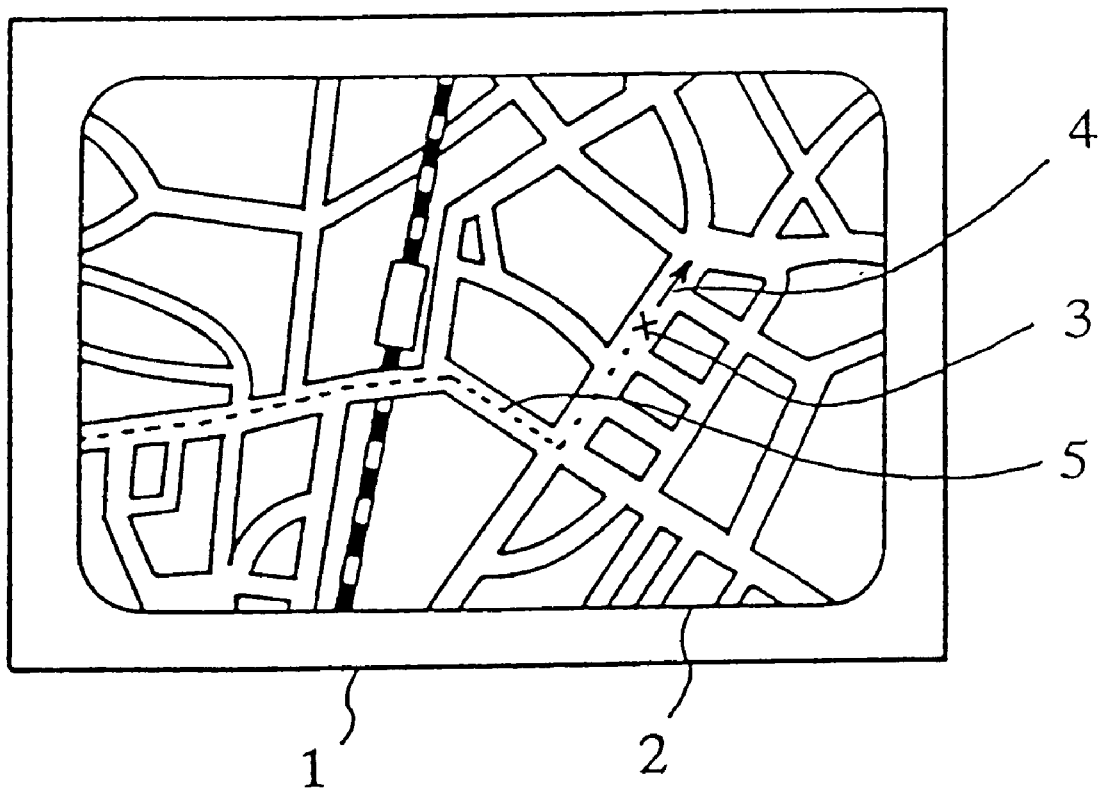
FIG. 1 is an explanatory diagram showing a guide screen employed in a conventional navigation system.
Figure 2:
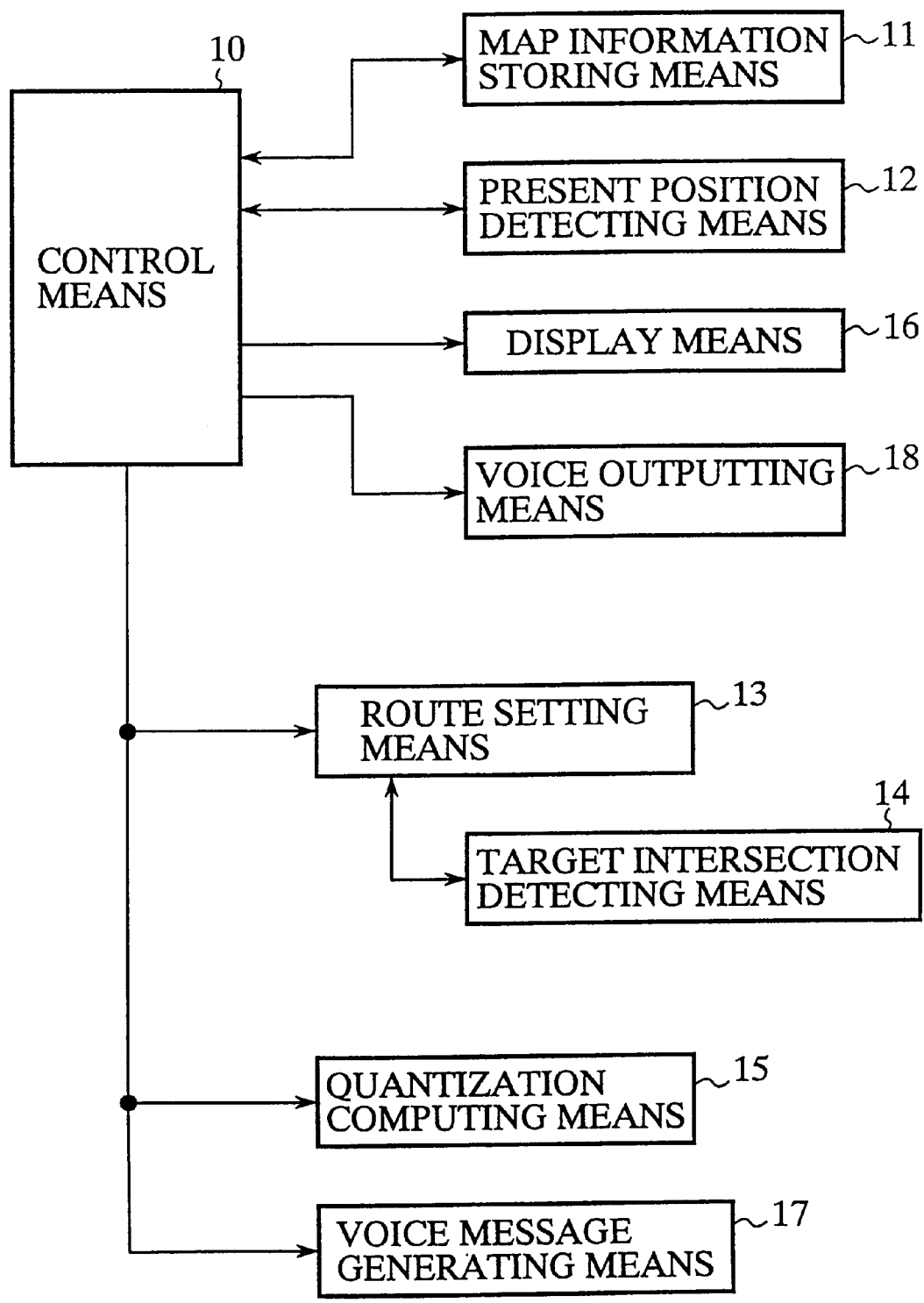
FIG. 2 is a block diagram showing a functional configuration of a navigation system according to an embodiment 1 of the present invention.

FIG. 2 is a block diagram showing a functional configuration of a navigation system according to an embodiment 1 of the present invention. In the drawing, reference numeral 10 indicates a control means for performing various computations used in the navigation system and controlling the entire navigation system. Reference numeral 11 indicates a map information storing means in which digitized map data such as road data, intersection data, etc. have been stored. Reference numeral 12 indicates present position detecting means for detecting the present position of a mobile body equipped with the navigation system. Reference numeral 13 indicates a route setting means for setting a route between two locations on the map data stored in the map information storing means 11. Reference numeral 14 indicates a target intersection detecting means for detecting a target intersection, on the route set by the route setting means 13 to guide the intersection. Reference numeral 15 indicates a quantization computing means for picking up the characteristic of a route for the mobile body, based on the relationship in distance between the nearest target intersection and the present position and quantizing it into simplified graphics form.

Reference numeral 16 indicates a display means for displaying the route quantized by the quantization computing means 15 for the target intersection detected by the target intersection detecting means 14. Reference numeral 17 indicates a voice message generating means having voice information storing means in which words or phrases or the like necessary for a guide message are stored in the form of voice waveform data. When the quantized route for the mobile body is displayed on the display means 16, the voice message generating means 17 selects voice waveform data such as words or phrases or the like indicative of a guide message corresponding to the route and generating the corresponding guide message by their combination. Reference numeral 18 indicates voice outputting means for notifying the guide message produced from the voice message generating means 17 to a user by voice.

Figure 3:
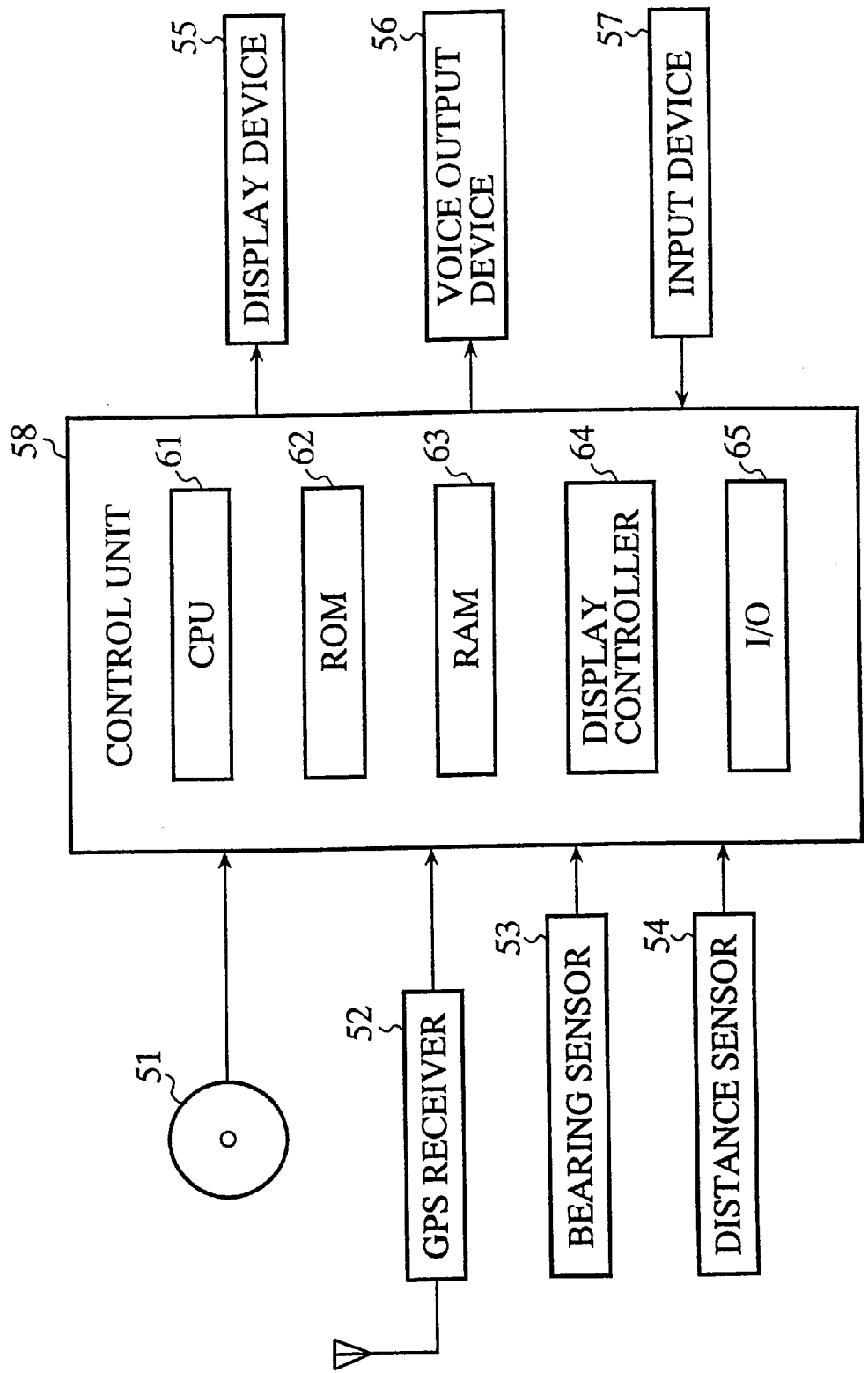
FIG. 3 is a block diagram illustrating a hardware configuration of the navigation system according to the embodiment 1 shown in FIG. 2.

FIG. 3 is a block diagram showing a hardware configuration of the navigation system referred to above. In the drawing, reference numeral 51 indicates a CD-ROM (Compact Disk-Read-Only Memory) with map data stored in digitized form and its reading device, which are associated with the map information storing means 11 shown in FIG. 2. Reference numeral 52 indicates a GPS (Global Positioning System) receiver for detecting the present position of a mobile body equipped with the navigation system from satellite radio waves. Reference numeral 53 indicates a bearing or azimuth sensor for detecting the bearing of the mobile body. Reference numeral 54 indicates a distance sensor for detecting a travel distance of the mobile body. These correspond to the present position detecting means 12 shown in FIG. 2.

Reference numeral 55 indicates a display device made up of, for example, a liquid crystal display or the like for displaying the quantized route or the like thereon. This device corresponds to the display means 16 shown in FIG. 2. Reference numeral 56 indicates a voice output device for outputting a guide message or the like corresponding to the display of the display device 55. The voice output device 56 corresponds to the voice outputting means 18 shown in FIG. 2. Reference numeral 57 indicates an input device for inputting signals for allowing a user to operate the navigation system.

Reference numeral 58 indicates a control unit for performing the overall control and various computations of the navigation system, which corresponds to the control means 10 shown in FIG. 2. In the control unit 58, reference numeral 61 indicates a CPU (Central Processing Unit) for performing the setting of a route, calculations such as quantization, etc. to thereby carry out the overall control on the control unit 58. Reference numeral 62 indicates a ROM (Read-Only Memory) in which programs and constants or the like used in the process of the operation of the CPU 61 are stored. Reference numeral 63 indicates a RAM (Random Access Memory) for developing programs or map data or the like in the process of treating of the CPU 61 and writing computational results therein. Reference numeral 64 indicates a display controller for controlling the display of the display device 55. Reference numeral 65 indicates an I/O (input/output device) for interfacing between the control unit 58 and the external various devices 51 through 57. Incidentally, the route setting means 13, a target intersection detecting means 14, quantization computing means 15, voice message generating means 17, etc. are implemented by processing operations to be executed by the control unit 58.

Figure 4:
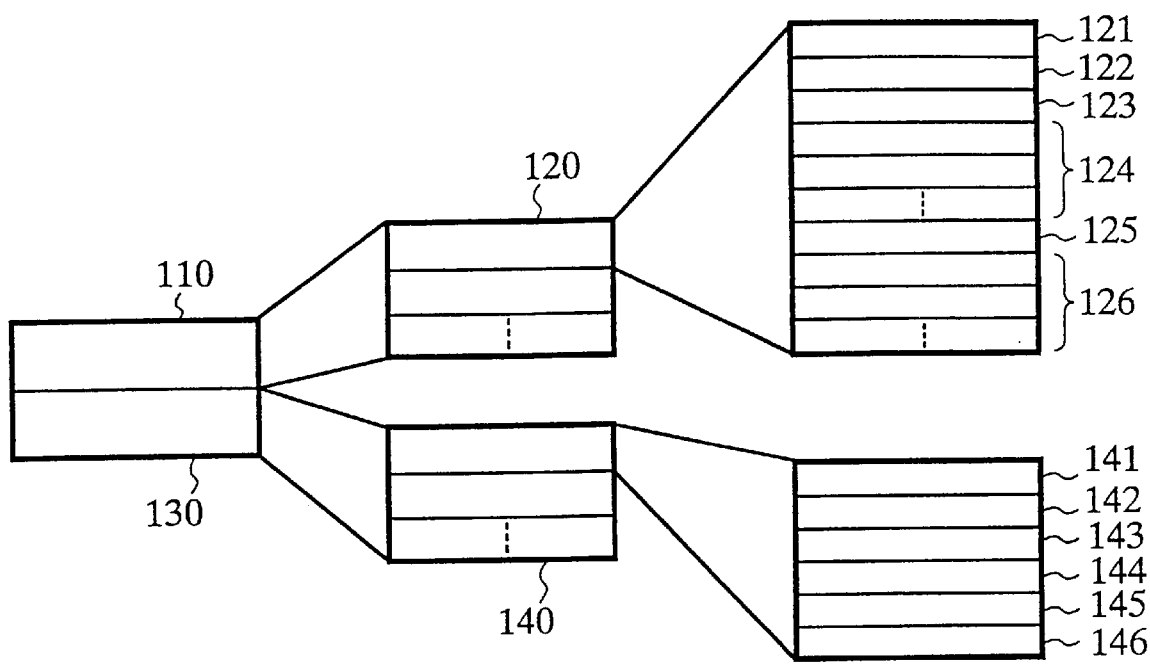
FIG. 4 is an explanatory diagram showing one example of map data employed in the embodiment 1 shown in FIG. 2.

FIG. 4 is an explanatory diagram showing the configuration of the map data stored in the map information storing means 11. In the drawing, reference numeral 110 indicates an intersection data group corresponding to a set of data about intersections, which is used as one component of the map data. Reference numeral 120 indicates an intersection data record indicative of a set of various data about each individual intersections. Incidentally, the intersection data group 110 is formed by a plurality of the intersection data records 120. Reference numeral 121 indicates an intersection number indicative of an identification number uniquely assigned to one intersection. Reference numeral 122 indicates intersection coordinates representing the position of the intersection on a map in latitudes and longitudes or the like. Reference numeral 123 indicates a connected road number indicative of the number of roads connected to the intersection. Reference numeral 124 indicates road numbers of the respective roads connected to the intersection. Reference numeral 125 indicates an intersection name indicative of the name of the intersection. Reference numeral 126 indicates facility data indicative of a set of data about facilities which exist in the neighborhood of the intersection. The respective intersection data records 120 comprise these intersection number 121, intersection coordinates 122, connected road number 123, road numbers 124, intersection name 125 and facility data 126.

Reference numeral 130 indicates a road data group indicative of a set of data about roads, which is used as another component of the map data. Reference numeral 140 indicates a road data record indicative of a collection of various data about each individual roads. Incidentally, the road data group 130 is formed by a plurality of the road data records 140. Reference numeral 141 indicates a road number indicative of an identification number uniquely assigned to one road. Reference numeral 142 indicates a start-point side intersection number indicative of an intersection connected to a start point of the road. Reference numeral 143 indicates an end-point intersection number indicative of an intersection connected to an end point of the road. Reference numeral 144 indicates a road length indicative of the length of the road. Reference numeral 145 indicates a road attribute indicative of the attribute of the road. Reference numeral 146 indicates a traffic regulation indicative of traffic regulation information about the road. The respective road data records 140 are formed by the road number 141, start-point intersection number 142, end-point intersection number 143, road length 144, road attribute 145 and traffic regulation 146.

Figure 5:
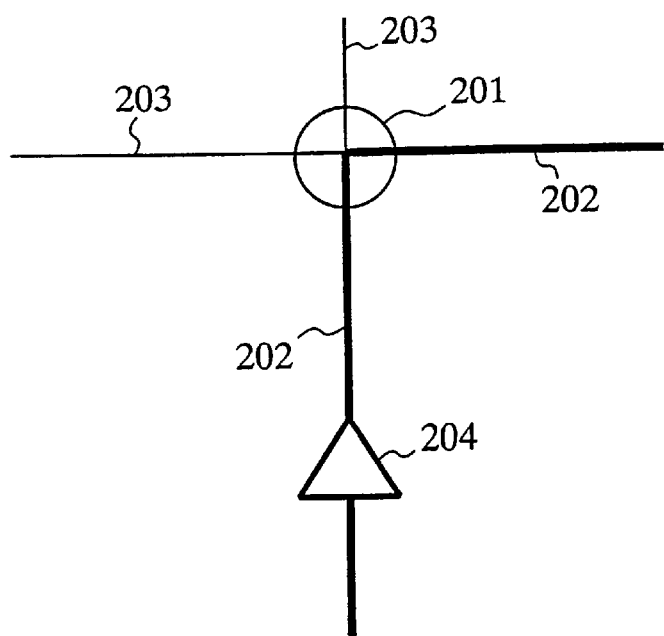
FIG. 5 is an explanatory diagram depicting one example of an actual map about a route set by route setting means employed in the embodiment 1 shown in FIG. 2.

FIG. 5 is an explanatory diagram showing one example of an actual map of a route set by the route setting means 13. In the drawing, reference numeral 201 indicates a target intersection, which is determined by the target intersection detecting means 14. Reference numeral 202 indicates a road (hereinafter called "route road") corresponding to the set route. Reference numeral 203 indicates a road other than the route road 202. Reference numeral 204 indicates the present position of a mobile body.

FIGS. 6(*a*)–6(*c*) are explanatory diagrams showing an example of a computational result of the quantization computing means 15, which is displayed on the display means 16. FIG. 6(*a*) is a displayed example at the time the distance between the present position of a mobile body and a target intersection is greater than L2 (e.g., 1000 m). In the drawing, reference numeral 310 indicates a displayed graphics indicative of the existence of a route along a road. FIG. 6(*b*) is a displayed example at the time the distance between the present position of the mobile body and the target intersection is smaller than or equal to the above L2 and greater than L3 (e.g., 300 m). In the drawing, reference numeral 320 indicates a displayed graphics indicative of a rough change (right turn) in route direction. FIG. 6(*c*) is a displayed example at the time the distance between the present position of the mobile body and the target intersection is smaller than or equal to L3 above. In the drawing, reference numeral 331 indicates a target intersection at which the direction of a route changes. Reference numeral 332 indicates the configuration of a road lying in the vicinity of the intersection 331, reference numeral 333 indicates a target route, and reference numeral 334 indicates the present position of the mobile body.

Figures 7, 10:
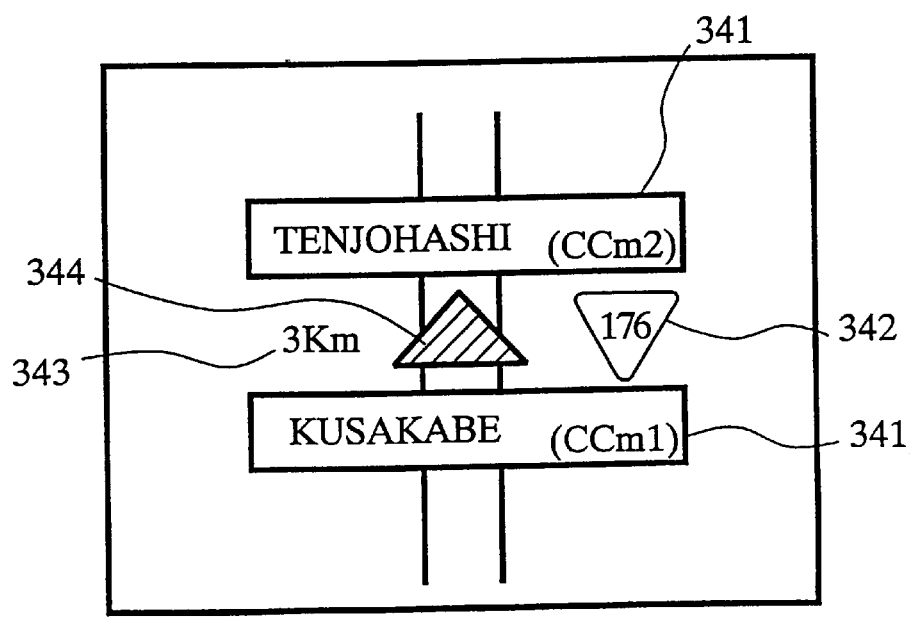
FIG. 7 is an explanatory diagram depicting one example of a voice message notified by the voice outputting means employed in the embodiment 1 shown in FIG. 2.
FIG. 10 is an explanatory diagram illustrating one example of a general route displayed on display means employed in the embodiment 2 shown in FIG. 9.

FIG. 7 is an explanatory diagram showing one example of a guide message notified by the voice outputting means 18 in association with the display of the result on the display means 16. In the drawing, reference numeral 411 indicates a guide message outputted from the voice outputting means 18. Reference numeral 412 indicates a guide condition indicative of a condition for outputting each individual guide messages 411. When a mobile body travels on a route toward a target intersection, a message of "proceed along the road over 1 km or more" indicated in a column "a" in the same drawing is outputted when the distance between the present position and the target intersection is greater than L2. When the distance therebetween becomes smaller than or equal to L2, a message of "turn to the right about 1 km ahead" indicated in a column "b" in the same drawing is outputted. When the distance therebetween becomes smaller than or equal to L3, a message of "turn to the right soon" indicated in a column "c" in the same drawing is outputted.

The operation will next be explained.

Figure 8:
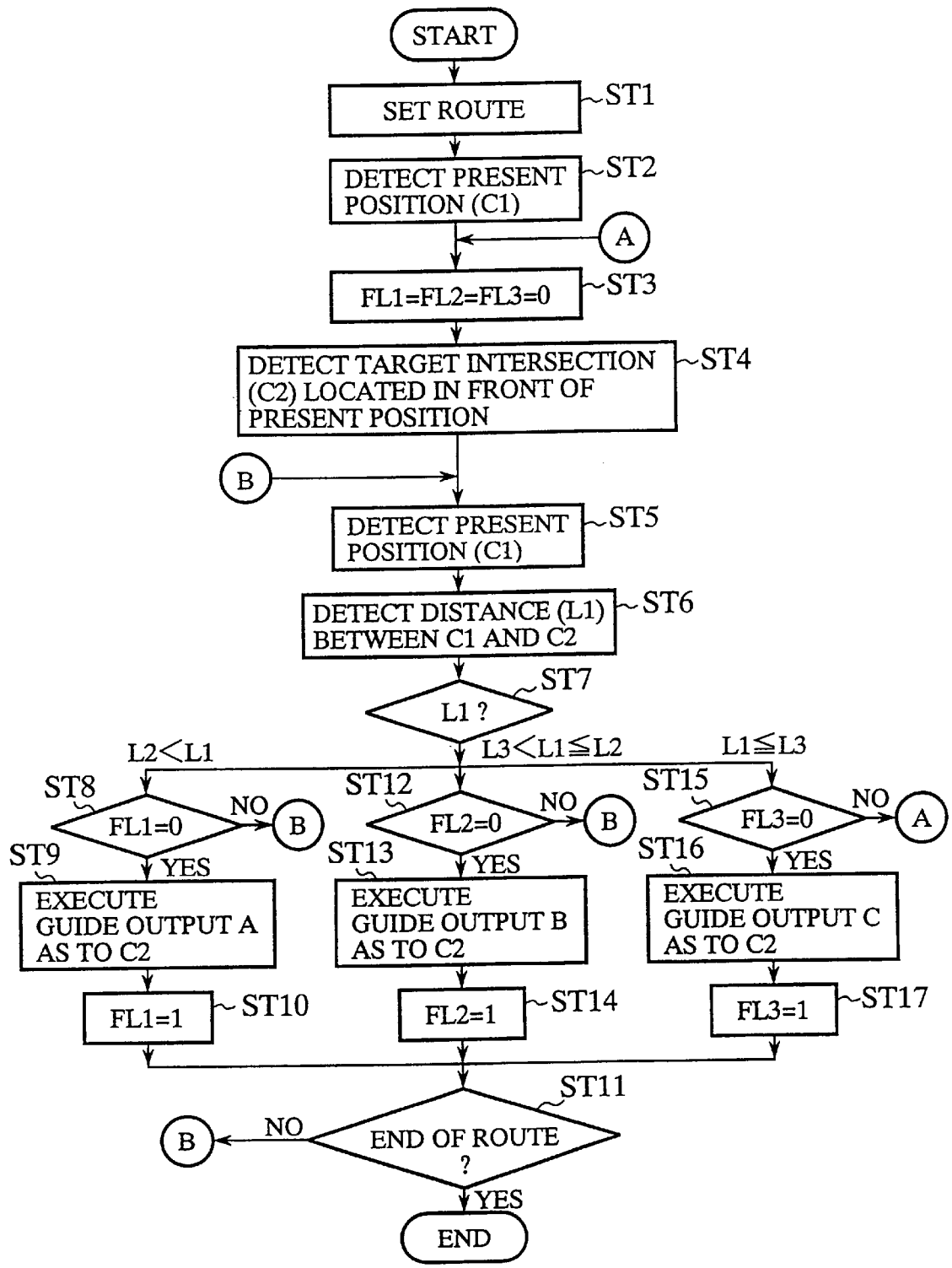
FIG. 8 is a flowchart for describing the flow of the operation of the navigation system employed in the embodiment 1 shown in FIG. 2.

Now, FIG. 8 is a flowchart showing the flow of processing of the navigation system according to the embodiment 1. When the processing starts, the route setting means 13 sets two locations on the map data read from the map information storing means 11 in accordance with the latitude and longitude or the like to thereby set a route between the two points by using a general search algorithm on a network, such as a Dijkstra method or the like in Step ST1. Next, in Step ST2, the present position detecting means 12 detects the present position (C1) of the mobile body and proceeds to Step ST3 where flags FL1, FL2 and FL3 are respectively initially set to 0. Next, in Step ST4, the target intersection detecting means 14 extracts an intersection to which, for example, three or more roads are connected, as a target intersection (C2) forward, from intersections lying on the route set by the route setting means 13 and intersections ahead of the present position (C1) detected by the present position detecting means 12, in the two locations set by the route setting means 13.

Next, in Step ST5, the present position detecting means 12 detects the present position (C1) of the mobile body again. In Step ST6, the present position detecting means 12 detects a distance (L1) extending along a road between the present position (C1) of the mobile body and the forward target intersection (C2), based on the map data shown in FIG. 4 read from the map information storing means 11. Next, in Step ST7, processes to be executed subsequent to the above are divided according to the value of the detected distance (L1). Namely, when the distance (L1) is greater than a specified value (L2) set to 1000 m, for example, the routine procedure proceeds to Step ST8 where it is identified whether or not the flag FL1 is 0. Since a guide output A to be described later is not yet executed if the flag FL1 is found to be 0 in Step ST8, the guide output A about the forward target intersection (C2) is executed in Step ST9.

The guide output A is as follows. The quantization computing means 15 takes out only a portion up to the target intersection 201 extracted as the forward target intersection (C2) on the route road 202 on the map shown in FIG. 5 and quantizes it into simple arrow form. The display means 16 displays the displayed graphics 310 about the forward target intersection (C2) shown in FIG. 6(a) thereon. Further, the voice message generating means 17 generates the guide message of "proceed along the road over 1 km or more" indicated in the a column in FIG. 7 about the corresponding forward target intersection (C2), and the voice outputting means 18 notifies it to the user by voice. Incidentally, only the display of the intersection guide map shown in FIG. 6(a) about the forward target intersection (C2), or only the output of the guide message indicated in the a column in FIG. 7 about the forward target intersection (C2) may be used as the guide output A.

When the guide output A about the forward target intersection (C2) is executed, the flag FL1 is next changed to 1 in Step ST10 and the execution of the guide output A about the forward target intersection (C2) is recorded. It is thereafter determined in Step ST11 whether processing has been made up to the end of the route set by the route setting means 13. If the answer is found to be NO in Step ST11, then the procedural processing is returned to Step ST5, where the present position (C1) of the mobile body is detected again by the present position detecting means 12. In Step ST6, the distance (L1) between the present position (C1) and the forward target intersection (C2) is detected. In Step ST7, the processing based on the value of the distance (L1) is divided into partial cases. If the distance (L1) is found to be greater than the specified value (L2), then whether or not the flag FL1 is 0, is identified in Step ST8. Since, in this case, the guide output A is already executed and the flag FL1 is already set to 1, the processing is returned to Step ST5 as it is, from which this processing is repeated subsequently until the distance (L1) becomes smaller than or equal to the specified value (L2).

When the distance (L1) is below the specified value (L2), the processing proceeds to Step ST12 while the distance (L1) is greater than the specified value (L3) set to, for example, 300 m according to the division of the processing in Step ST7. In Step ST12, whether or not the flag FL2 is 0, is identified. Since a guide output B to be described later is not yet executed if the flag FL2 is found to be 0 in Step ST12, the guide output B about the forward target intersection (C2) is executed in Step ST13.

The guide output B is as follows. The quantization computing means 15 takes out only the route road 202 connected to the target intersection 201 shown in FIG. 5 extracted as the forward target intersection (C2) and quantizes it into simple arrow form. The display means 16 displays the displayed graphics 320 about the forward target intersection (C2) shown in FIG. 6(b) thereon. Further, the voice message generating means 17 generates the guide message of "turn to the right about lkm ahead" indicated in the b column in FIG. 7 about the corresponding forward target intersection (C2), and the voice outputting means 18 outputs it therefrom. Incidentally, even in the case of the guide output B, only the display of the intersection guide map shown in FIG. 6(b) about the forward target intersection (C2), or only the output of the guide message indicated in the b column in FIG. 7 about the forward target intersection (C2) may be used as the guide output B.

When the guide output B about the forward target intersection (C2) is executed, the flag FL2 is next changed to 1 in Step ST14 and the execution of the guide output B about the forward target intersection (C2) is recorded. It is thereafter determined in Step ST11 whether processing has been made up to the end of the route set by the route setting means 13. If the answer is found to be NO in Step ST11, then the procedural processing is returned to Step ST5, where the present position (C1) of the mobile body is detected again by the present position detecting means 12. In Step ST6, the distance (L1) between the present position (C1) and the forward target intersection (C2) is detected. In Step ST7, the processing based on the value of the distance (L1) is divided into partial cases. If the distance (L1) is found to be greater than the specified value (L3) and smaller than or equal to the specified value (L2), then whether or not the flag FL2 is 0, is identified in Step ST12. Since, in this case, the guide output B is already executed and the flag FL2 is already set to 1, the processing is returned to Step ST5 as it is, from which this processing is repeated subsequently until the distance (L1) becomes smaller than or equal to the specified value (L3).

When the distance (L1) becomes smaller than or equal to the specified value (L3), the procedural processing proceeds to Step ST15 according to the division of the processing in Step ST7. Whether or not the flag FL3 is 0, is identified in Step ST15. Since a guide output C to be described later is not yet executed if the flag FL3 is found to be 0 in Step ST15, the guide output C about the corresponding forward target intersection (C2) is executed.

The guide output C is as follows. The quantization computing means 15 takes out the target intersection 201 extracted as the forward target intersection (C2), the route road 202 connected to the target intersection 201, a road 203 other than the route road 202, and the present position 204 of the mobile body, all of which are shown in FIG. 5, and quantizes them into simple form. As shown in FIG. 6(c), the target intersection 331 is represented as a circle and the road configuration 332 lying in the neighborhood of the target intersection 331 is represented in the form of a set of rectangles. Further, the target route 333 thereon is superimposed on the road configuration 332 in the form of an arrow and the present position 334 of the mobile body is superimposed on the route 333 in the form of a triangle. Thereafter, they are displayed on the display means 16. Further, the voice message generating means 17 generates the guide message of "turn to the right soon" indicated in column "c" in FIG. 7 about the corresponding forward target intersection (C2), and the voice outputting means 18 outputs it therefrom. Incidentally, even in the case of the guide output C, only the display of the intersection guide map shown in FIG. 6(c) or only the output of the guide message indicated in the c column in FIG. 7 may be used as the guide output C.

When the guide output C about the forward target intersection (C2) is executed, the flag FL3 is next changed to 1 in Step ST16 and the execution of the guide output B about the forward target intersection (C2) is recorded. It is thereafter determined in Step ST11 whether processing has been made up to the end of the route set by the route setting means 13. If the answer is found to be NO in Step ST11, then the procedural processing is returned to Step ST5, where the present position (C1) of the mobile body is detected again by the present position detecting means 12. In Step ST6, the distance (L1) between the present position (C1) and the forward target intersection (C2) is detected. In Step ST7, the processing based on the value of the distance (L1) is divided into partial cases. If the distance (L1) is found to be smaller than or equal to the specified value (L3), then whether or not the flag FL3 is 0, is identified in Step ST15. Since, in this case, the guide output A is already executed and the flag FL3 is already set to 1, the processing is returned to Step ST3 as it is, where the respective flags FL1, FL2 and FL3 are initially set to 0. In Step ST4, the following forward target intersection (C2) is extracted. In Step ST11, the above series of processes are repeated subsequently until the completion of the processing up to the end of the route set by the route setting means 13 is detected.

Figure 6A:
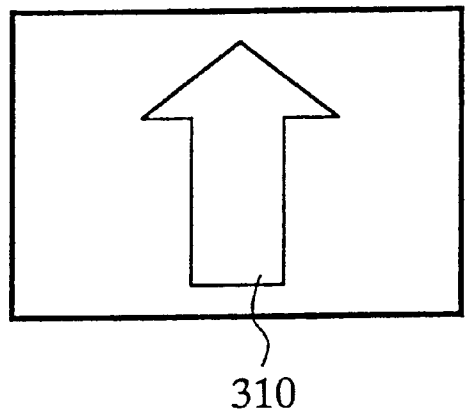
FIGS. 6(a)–(c) are explanatory diagrams showing examples of an intersection guide map displayed on a display means employed in the embodiment 1 shown in FIG. 2.
Figure 6B:
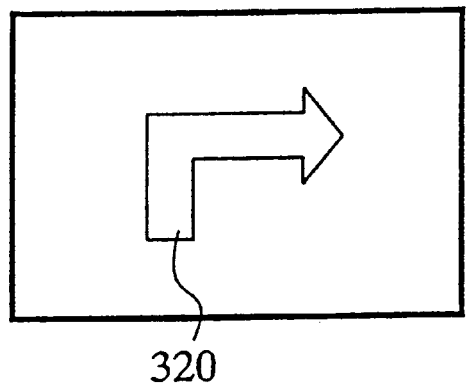
Figure 6C:
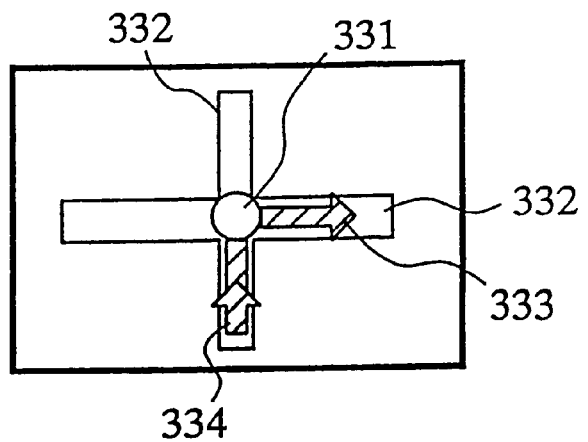

Thus, when the distance between the present position of the mobile body and the target intersection is greater than the specified value L2 (e.g., 1000 m), in other words, when the mobile body continues to go straight ahead where the mobile body moves on the route toward the target intersection, guidance given by the displayed graphics 310 shown in FIG. 6(a) is displayed on the display means 16. Further, the guide message indicated in the a column in FIG. 7 is outputted. When the distance between the present position of the mobile body and the target intersection becomes smaller than or equal to the specified value L2, the guide display of the display means 16 is switched to the displayed graphics 320 shown in FIG. 6(b) and the guide message indicated in the b column in FIG. 7 is outputted. Further, when the distance between the present position of the mobile body and the target intersection becomes smaller than or equal to the specified value L3 (e.g., 300 m), the guide display is switched to a guide display indicative of the entire structure of the target intersection 331, based on the target intersection 331, the road form 332 lying in the vicinity thereof, and the target route 333 and the present position 334 of the mobile body body all shown in FIG. 6(c), and the guide message indicated in the c column in FIG. 7 is outputted.

According to the embodiment 1 as described above, since the route is represented in the form of simple graphics such as arrows or the like without having to display the map screen including information which is necessarily required for actual running, the screen display is simplified. Further, since the displayed contents are changed in stepwise form according to the distance up to the target intersection, the user is able to easily recognize or understand action to be taken at the target intersection, such as the right and left turns at the target intersection, and hence the load for recognizing the displayed contents is reduced. Further, since the need for frequent observation of the screen with the route displayed thereon by the user is reduced due to the notification of the route by voice according to the guide message. The result is that the user can concentrate on his/her driving and safer driving can be provided for the user.

Another effect can be obtained in that since the screen display is simplified, it is easy to ensure visibility even if an inexpensive display device with a small screen display or one which is low in resolution is used. Furthermore the use of a display panel of an air conditioner, a display panel of a speedometer, etc. can be shared.

In the above description, the voice message shown in FIG. 7 is outputted only upon execution of the guide output A, B or C about the target intersection. At this time, however, a voice message corresponding to a guide screen displayed on the display means 16 may be notified to the user by the voice outputting means 18 through the switch operation or the like whenever necessary. Owing to this treatment, the user can recognize the outline of route conditions through the voice message if the user performs the switch operation. Since the guide screen of the display means 16 may not be viewed except for the true required case, the user can concentrate more attention on his/her driving.

Although the embodiment 1 is constructed assuming that the program used to execute a quantization computation would be stored in the ROM 62 in the control unit 58 in advance, all or some of the program is stored in an external storage medium such as a CD-ROM or the like and read from the external storage medium as needed by using a reproduction device. The read program may be used for the quantization computation by the quantization computing means 15. As a result, the replacement of the program by another becomes easy, and the replacement of a faulty portion with another and the upgrading of a version or the like can be easily performed.

Embodiment 2

Since the road map is not displayed on the display means 16 in the embodiment 1, the user has difficulties in recognizing, at the route-set stage in advance, what route the user traces to reach destination. The embodiment 2 allows the user to recognize set routes up to the intended place in advance.

Figure 9:
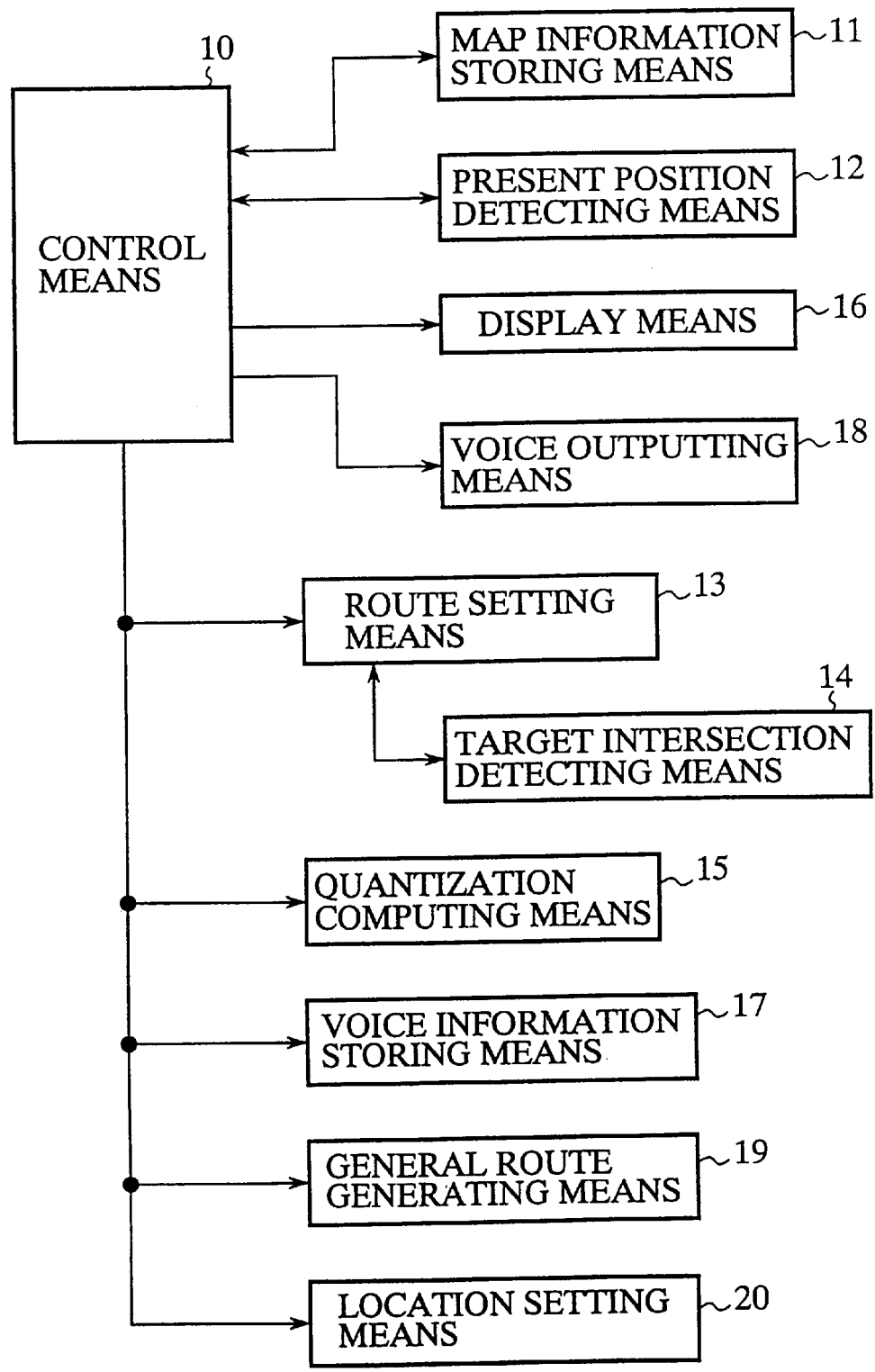
FIG. 9 is a block diagram showing a functional configuration of a navigation system according to an embodiment 2 of the present invention.

FIG. 9 is a block diagram showing a functional configuration of a navigation system according to such an embodiment 2 of the present invention. Parts corresponding to those employed in the embodiment 1 are identified by the same reference numerals as those shown in FIG. 2 and their descriptions will be omitted. In the drawing, reference numeral 19 indicates general route generating means for arranging, in list form, the names of target intersections, road names and numbers, the distance between the respective target intersections, etc. on a route set by route setting means 13, all of which are detected by target intersection detecting means 14, to thereby generate a general route. Reference numeral 20 indicates location setting means for setting each arbitrary point on the route to specify a display range used to display the general route generated by the general route generating means 19 on display means 16.

FIG. 10 is an explanatory diagram showing a display example of the general route generated by the general route generating means 19. In the drawing, reference numeral 341 indicates the name of each target intersection, reference numeral 342 indicates road information about a road name, a road number, etc. between the target intersections, reference numeral 343 indicates the distance between the target intersections, and reference numeral 344 indicates the present position of a mobile body body.

The operation will next be explained.

Now, FIG. 11 is a flowchart showing the flow of processing of the navigation system according to the embodiment 2. In Step ST20, the route setting means 13 first sets two locations on a map read from map information storing means 11 in accordance with the latitudes and longitudes or the like to thereby set a route between the two points by using a general search algorithm on a network, such as a Dijkstra method or the like. Next, in Step ST21, a point (CC) to be noted is defined as a start point (S) of a route. Further, in Step ST22, a counter i is set to 1. Now, the point (CC) to be noted is one like a variable used during repetition of a general route generating process to be executed by the general route generating means 19. It is successively updated during the repeat processing. When one attempts to create a general route, the point to be noted is first regarded as the route start point (S) and target intersections in the route are arranged in turn so as to finally reach the end (G) of the route.

Figure 12:
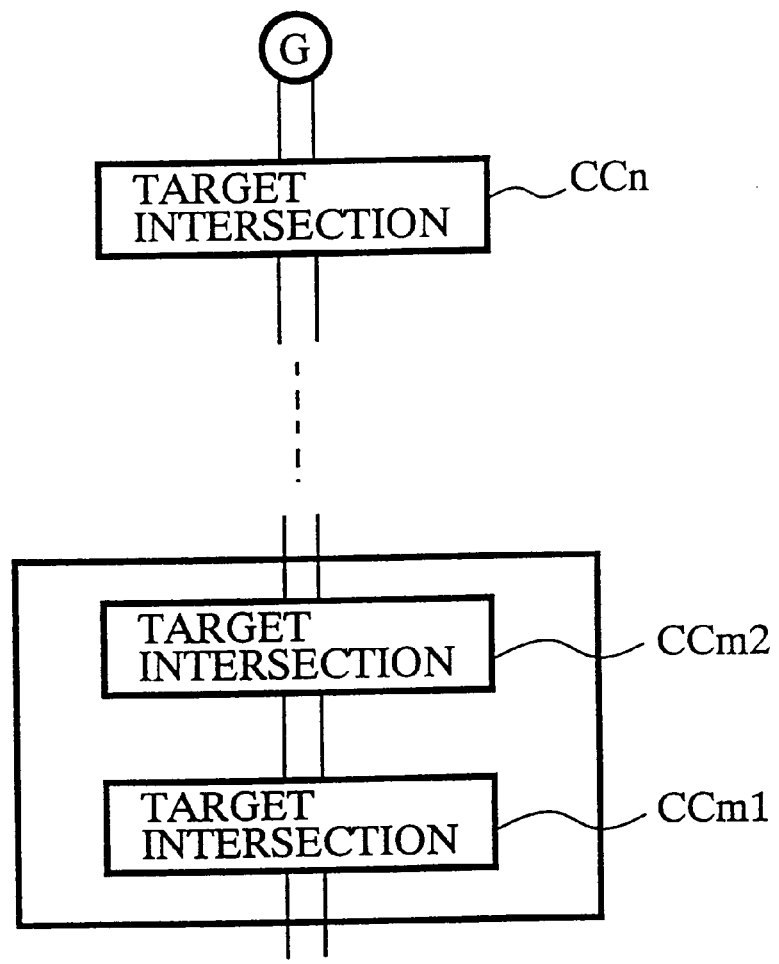
FIG. 12 is an explanatory diagram showing the manner in which numbers are assigned to respective target intersections in the embodiment 2 shown in FIG. 9.

Incidentally, FIG. 12 is an explanatory diagram showing the manner in which numbers are assigned to respective target intersections lying between a route start point (S) of a generated general route and the end (G) of the route. Numbers of CC1, CC2 . . . , CCn are assigned to the respective target intersections in turn as seen from the route start point (S) side. The target intersections in the route are sequentially arranged in this order up to the end (G) of the route.

Namely, a target intersection (CCi) ahead of the point (CC) to be noted is first detected in Step ST23. Since the counter i is already set to 1 in this case, the target intersection (CC1) is detected. Next, the distance Li between the point (CC) to be noted and the target intersection (CCi) is detected in Step ST24. Further, the name Ri and number Ni of each road lying between the point (CC) to be noted and the target intersection (CCi) are detected in Step ST25. Thereafter, in Step ST26, the point (CC) to be noted is updated according to the detected target intersection (CCi) and the counter i is incremented. The processes subsequent to Step ST23 are repeated subsequently until the end (G) of the route is detected in Step ST27.

Thus, all the target intersections from the route start point (S) to the end (G) of the route are detected in turn in accordance with the numbers (CCi) assigned thereto as shown in FIG. 12. Further, the distances (Li) between the respective target intersections and the names (Ri) and numbers (Ni) of routes lying between the respective target intersections are respectively detected.

Thereafter, in Step ST28, m1 and m2 for specifying a display range on the route are set by the point setting means 20. When m1 and m2 are set, a guide for intersections and roads between a target intersection (CCm1) and a target intersection (CCm2) corresponding to the set m1 and m2 is displayed on the display means 16 in Step ST29. At this time, the present position 344 of the mobile body body may be displayed together as shown in FIG. 10. Although FIG. 10 has shown the case in which the target intersections 341 have been arranged and displayed in a vertical direction, it is needless to say that they may be arranged and displayed in a horizontal direction.

The above description has shown the case in which the generated general route is displayed only once. However, referring back to FIG. 11, the user is urged to change the setting of m1 and m2 by the point setting means 20 and make an input as to whether the display of the general route should be done again, whereby the processing subsequent to Step ST28 may be repeatedly executed.

According to the embodiment 2 as described above, since the respective target intersections on the route set between the two points on the map and the information about the roads lying therebetween are listed as a general route and set so as to be displayable, an effect can be brought about in that the phase of the route can be recognized as characters without regard to the present position and the user can recognize in advance what route the user traces so as to reach the destination at the stage in the route setting.

Incidentally, the above description shows the case in which the general route display function is added to the navigation system shown in the embodiment 1. However, it may be applied to another type of navigation system. An effect similar to that obtained in the embodiment 2 is brought about.

Although the embodiment 2 is constructed assuming that the program used to generate the general route would be stored in the ROM 62 in the control unit 58 in advance, all or some of the program is stored in an external storage medium such as a CD-ROM or the like and read from the external storage medium as needed by using a reproduction device, and the read program may be used for the generation of the general route by the general route generating means 19. By doing so, the replacement of the program by another becomes easy, and the replacement of a faulty portion with another and the upgrading of a version or the like can be easily performed.

Embodiment 3

Although the embodiment 2 has shown the case in which the general route is displayed on the display means 16, it may be notified to the user through a voice message.

Figure 13:
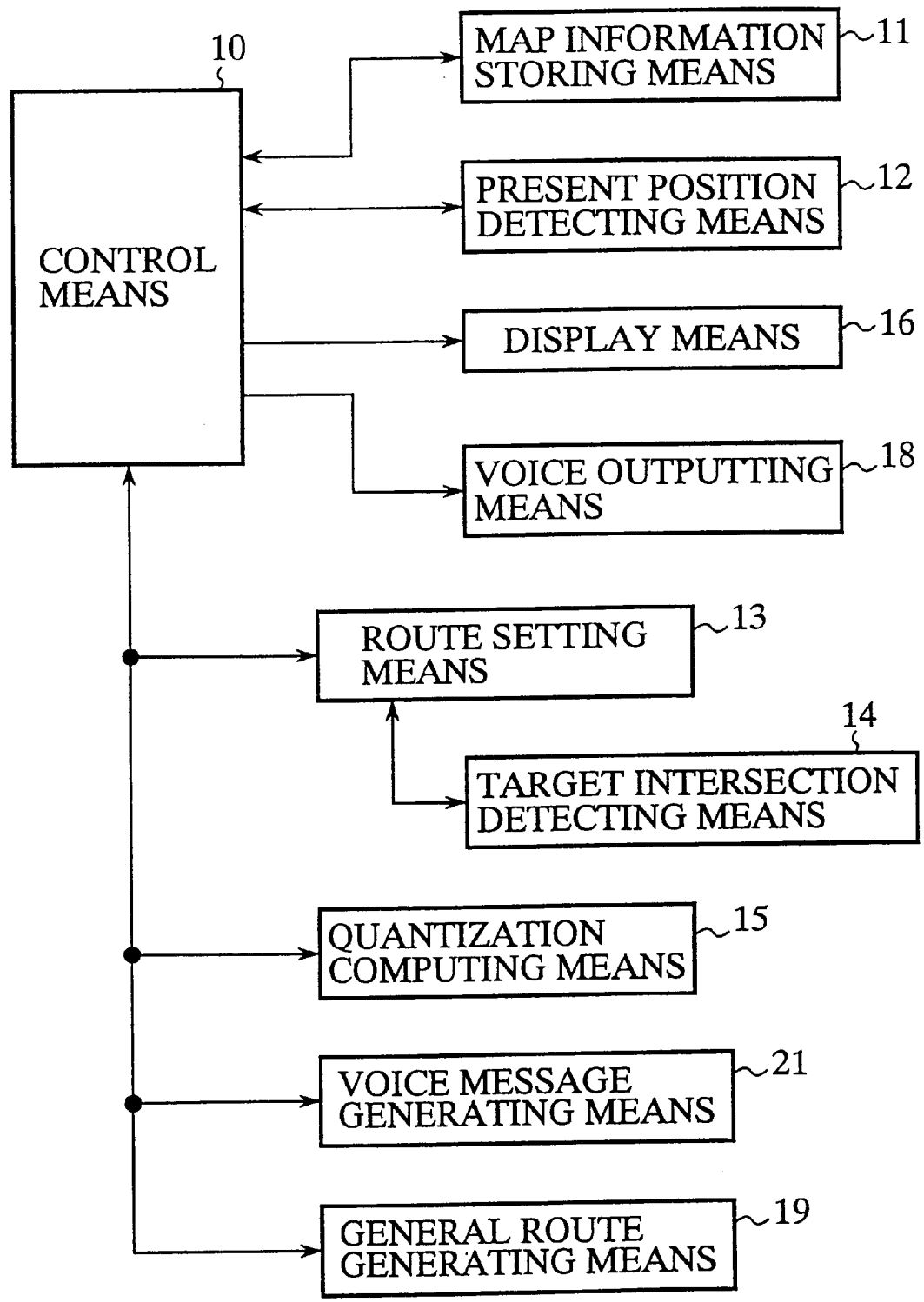
FIG. 13 is a block diagram depicting a functional configuration of a navigation system according to an embodiment 3 of the present invention.

FIG. 13 is a block diagram showing a functional configuration of a navigation system according to such an embodiment 3 of this invention. Parts corresponding to those employed in the embodiment 2 are identified by the same reference numerals as those in FIG. 9 and their descriptions will be omitted. In the drawing, reference numeral 21 indicates voice message generating means. However, voice information storing means incorporated in the voice message generating means stores words or phrases or the like included in messages used to notify road information about the names of target intersections, right and left turns, road names, road numbers, etc., distances between the respective target intersections, site frontage names, etc. by voice therein as voice waveform data. Further, the present voice information storing means is different from that designated at numeral 17 in FIG. 9 in that when a general route is created by general route generating means 19, the voice information storing means selects voice waveform data corresponding to the created route and outputs it to voice outputting means 18.

FIG. 14 is an explanatory diagram showing one example of a voice message selected/outputted by the voice message generating means 21. In the drawing, reference numeral 421 indicates a target object by voice, reference numeral 422 indicates a voice message corresponding to the target object 421, reference numeral 423 indicates a traveling direction on a route, and reference numeral 424 indicates a voice message corresponding to the traveling direction 423. Reference numeral 425 indicates one example of a general route notification message created based on these.

The operation will next be described.

Figure 15:
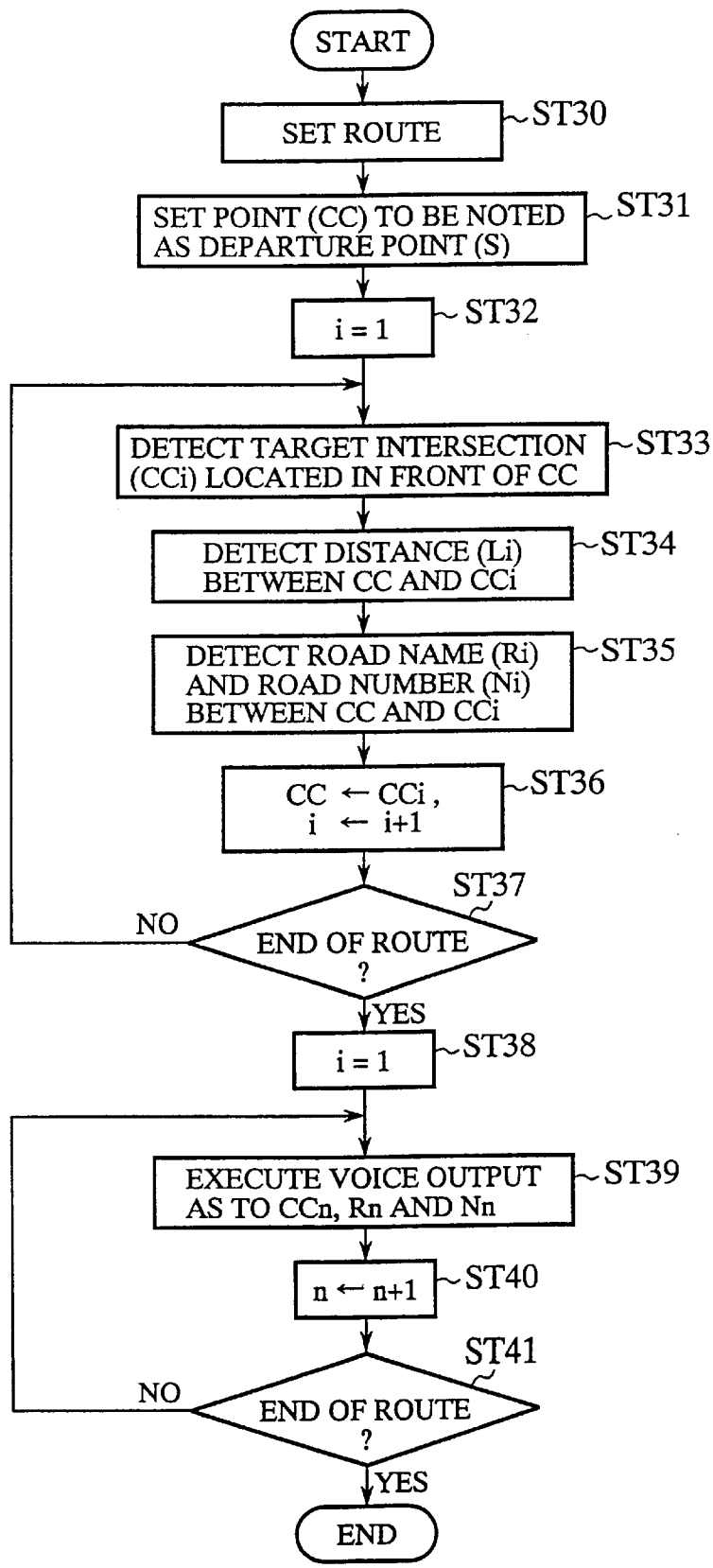
FIG. 15 is a flowchart illustrating the flow of the operation of the navigation system according to the embodiment 3 shown in FIG. 13.

Now, FIG. 15 is a flowchart showing the flow of processing of the navigation system according to the embodiment 3. In Step ST30, two locations or points on a map are first set and a route between the two points is set. Further, a point (CC) to be noted is defined as a route start point (S) in Step ST31, and a counter i is set to 1 in Step ST32. Next, in Step ST33, a target intersection (CCi) located ahead of the point (CC) to be noted is detected in Step ST33. The distance (Li) between the point (CC) to be noted and the target intersection (CCi) is detected in Step ST34, and the name (Ri) and number (Ni) of a road between the point (CC) to be noted and the target intersection (CCi) are detected in Step ST35. Next, in Step ST36, the point (CC) to be noted is set to the target intersection (CCi) and the counter i is incremented. The processes subsequent to Step ST33 are repeated until the end (G) of the route is detected in Step ST37. Incidentally, the processes used up to this point are similar to those employed in the embodiment 2.

When the end (G) of the route is detected in Step ST37, the procedural processing proceeds to Step ST38 where the counter i is reset to 1. In Step ST39, the voice message generating means 21 thereafter outputs a guide voice (e.g., one selected from the voice message 422 or 424 shown in FIG. 14 according to the target object 421 and the traveling direction 423) about a target intersection (CCi), the name of a road between target intersections, the number (Ni) of the road to the voice outputting means 18 according to the value of the counter i. Next, the counter i is incremented in Step ST40. The processes subsequent to Step ST39 are repeated until the end (G) of the route is detected in Step ST41.

Thus, the voice outputting means 18 notifies to the user, a general route notification message 425 illustrated in FIG. 14 by way of example, like, e.g., "depart from start place and advance a national road No. 176 to the south", "turn at a Tenjinbashi intersection located about 5 km ahead to the right and advance a prefectural road No. 82 to the west" and "turn to the left at a Nishinomiya North interchange gate located about 500 m ahead and proceed in the direction of Osaka along the Chugoku highway", i.e., target intersections, road names, road numbers, traveling directions, zone distances in route order from the route start place.

Namely, the target intersections, the name of the road therebetween, the zone distance therebetween and the traveling direction are detected during Steps ST30 to ST37 referred to above. During Steps ST38 to ST41, the target intersections, the name of the road therebetween, the zone distance therebetween and the traveling direction detected in this way are read up in route order.

According to the embodiment 3 as described above, an effect can be obtained in that since the general route in which the respective target intersections on the route set between the two points on the map and the information about the roads lying therebetween are listed, is notified by voice, the user is able to recognize the state of the route even if the user does not view the display screen, and no user's attention is turned away from ahead during driving, thereby allowing safer driving.

Incidentally, the above description has demonstrated the function of notifying the general route by voice is added to the navigation system shown in the embodiment 2. However, it can be also applied to another type of navigation system. In this case, an effect similar to that obtained in the embodiment 3 can be brought about.

Embodiment 4

Since no road map is displayed on the display means 16 in the embodiment 1, the user has difficulties in recognizing whether the mobile body body could be returned to the set route if the mobile body body is driven in any direction and to any distance from its present position, where no mobile body body exists on the route set by the route setting means 13 as in the case where the mobile body body fails to turn the target intersection according to the instructions or where the guidance is started from a location unused as a road, such as a parking lot or the like. The present embodiment 4 is one wherein the distance from the present position of the mobile body body to the set route and the direction of the mobile body body as seen in the set route from the present position thereof can be recognized.

Figure 16:
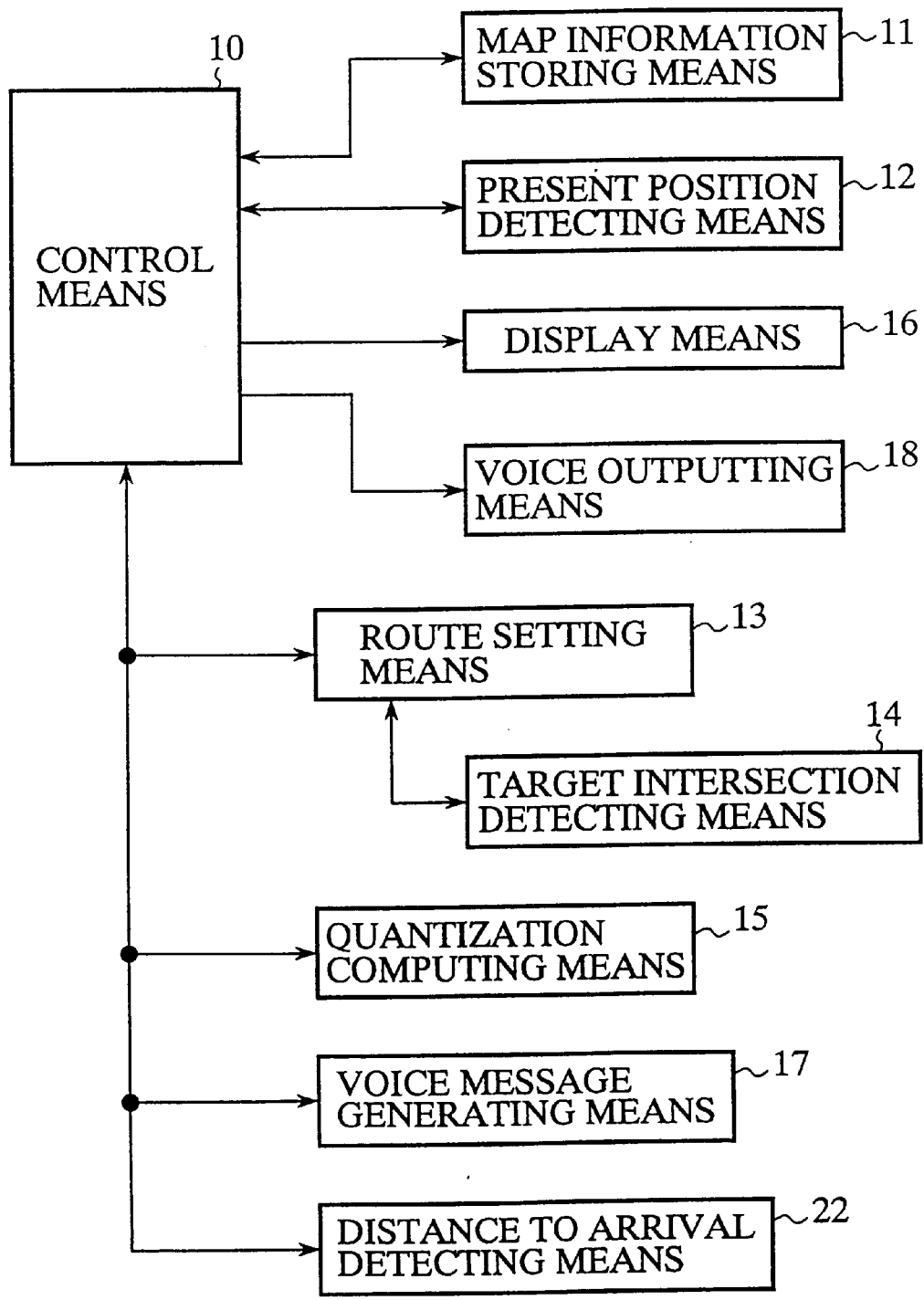
FIG. 16 is a block diagram depicting a functional configuration of a navigation system according to an embodiment 4 of the present invention.

FIG. 16 is a block diagram showing a functional configuration of a navigation system according to such an embodiment 4 of this invention. Parts corresponding to those employed in the embodiment 1 are identified by the same reference numerals as those shown in FIG. 2 and their descriptions will be omitted. In the drawing, reference numeral 22 indicates the route achievable distance detecting means for detecting the distance and direction between a route set by route setting means 13 and the present position of a mobile body body from map data stored in map information storing means 11 on the basis of the route set by the route setting means 13.

Figure 17:
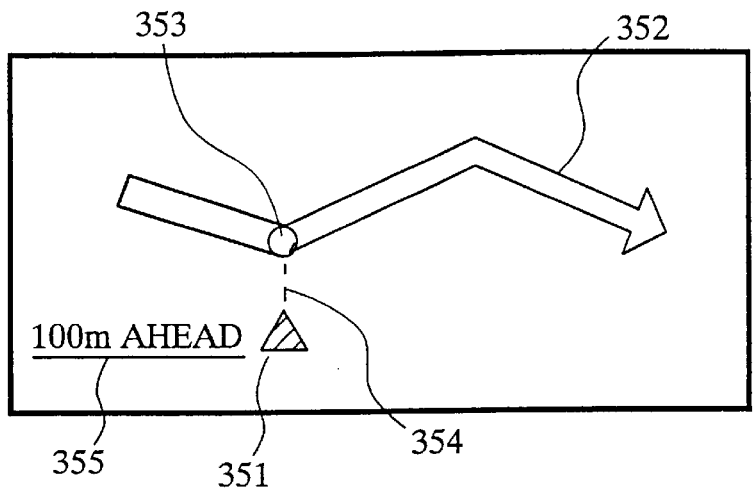
FIG. 17 is an explanatory diagram showing one example of a route achievable distance displayed on display means employed in the embodiment 4 shown in FIG. 16.

FIG. 17 is an explanatory diagram showing an example in which the distance and direction between the present position of the mobile body body and the route both detected by the route achievable distance detecting means 22 are displayed. In the drawing, reference numeral 351 indicates the present position of the mobile body body, reference numeral 352 indicates a route lying in the vicinity of the present position 351 of the mobile body body, reference numeral 353 indicates an on-route near point indicative of a position nearest to the present position 351 of the mobile body on the route 352, reference numeral 354 indicates a straight line for connecting the on-route near point 353 and the present position 351 of the mobile body, and reference numeral 355 indicates a linear distance represented by the straight line 354, between the present position 351 of the mobile body and the on-route near point 353.

The operation will next be described.

Figure 18:
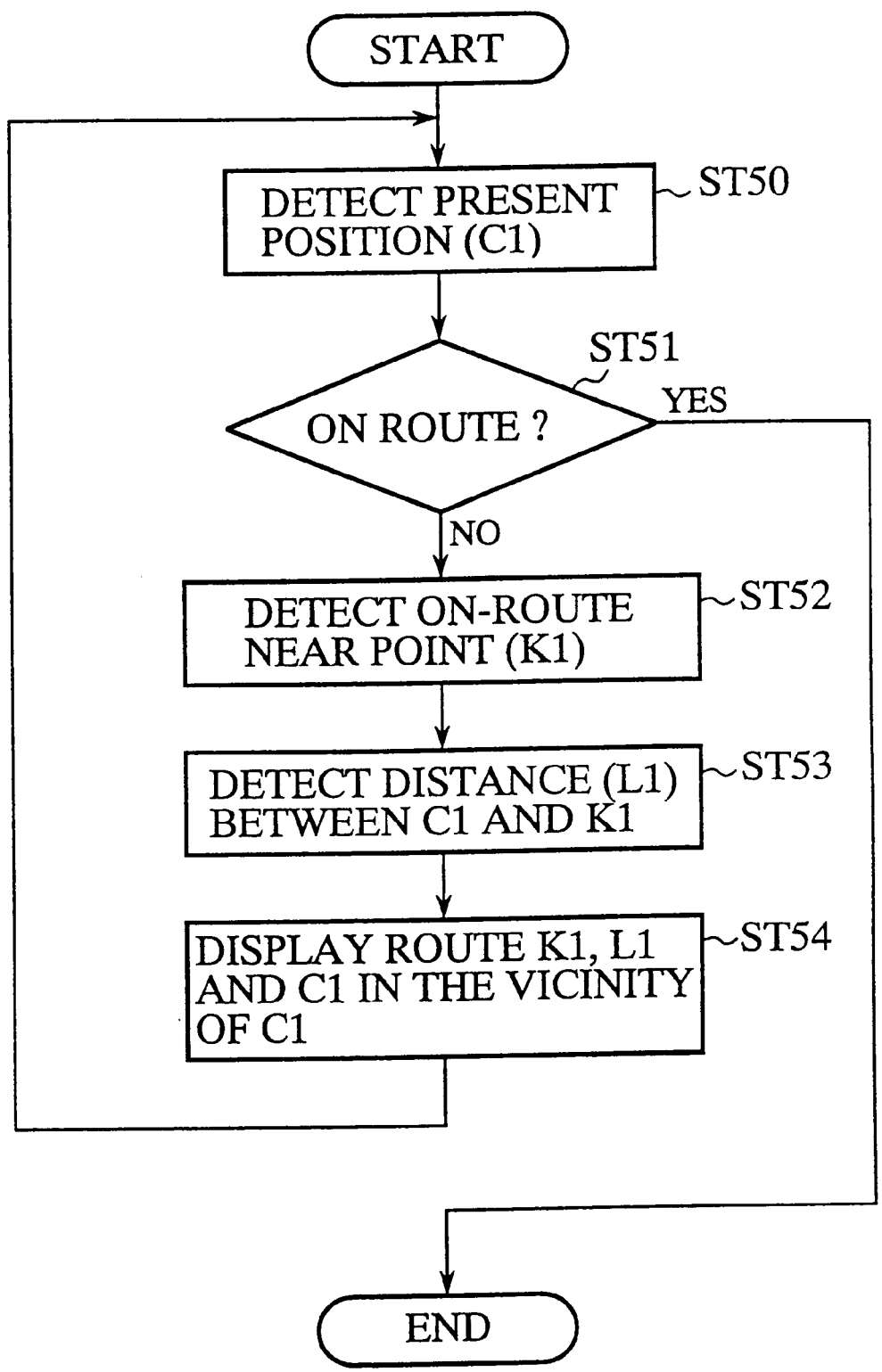
FIG. 18 is a flowchart illustrating the flow of the operation of the navigation system according to the embodiment 4 shown in FIG. 16.

Now, FIG. 18 is a flowchart showing the flow of processing of the navigation system according to the embodiment 4.

In Step ST50, the present position (C1) of the mobile body is detected by present position detecting means 12. It is next determined in Step ST51 whether the detected present position (C1) is presently placed on the route set by the route setting means 13. If the answer is found to be YES in Step ST51, then this processing is terminated as it is. On the other hand, when it is determined in Step ST51 that the present position (C1) is not on the set route, the procedural processing proceeds to Step ST52 where an on-route near point (K1) nearest to the present position (C1) on the route is detected. Described specifically, now consider a circle whose radius increases little by little from 0 with the present position (C1) as the center on the map data read from the map information storing means 11. A point on the route, which is tangent to this circle, will be defined as an on-route near point (K1).

Next, the distance (L1) between the detected present position (C1) and the on-route near point (K1) is detected in Step ST53. Incidentally, the distance (L1) is determined as the radius when the aforementioned circle is tangential to the on-route near point (K1) on the route. Next, in Step ST54, the present position 351 of the mobile body, the route 352 located in the vicinity of the present position 351, the on-route point 353, the straight line 354 and the linear distance 355 are displayed on the display means 16, based on the detected present position (C1), on-route near point (k1) and distance (L1) as shown in FIG. 17. Thereafter, the procedural processing is returned to Step ST50 from which the above-described processes are repeated until the present position of the mobile body is placed on the route.

Upon displaying the route 352 located in the neighborhood of the present position 351 of the mobile body on the display means 16, it is displayed by cutting a portion of the set route, which is near the present position of the mobile body, from the map data and quantizing the cut portion into simple arrow form by the quantization computing means 15. As a result, a simple display can be performed wherein the user can easily recognize or understand the displayed contents and the load for its recognition is low.

According to the embodiment 4 as described above, an effect is brought about in that since the direction in which the route exists and the distance to the route are displayed by a simple graphics even when the present position of the mobile body is not on the route, the user can sensibly recognize whether the mobile body can follow the route, depending on in which direction and how far the mobile body moves, even if a road map is not displayed.

The above description has shown how the function of displaying the route achievable distance or the like is added to the navigation system shown in the embodiment 1. However, it may be applied to another type of navigation system. In this case, an effect similar to that obtained in the embodiment 4 can be brought about.

Although the embodiment 4 is constructed assuming that the program used to detect the route achievable distance would be stored in the ROM 62 in the control unit 58 in advance, all or some of the program is stored in an external storage medium such as a CD-ROM or the like and read from the external storage medium as needed by using a reproduction device, and the read program may be used for the detection of the route achievable distance by the route achievable distance detecting means 22. As a result, the replacement of the program by another becomes easy, and the replacement of a defective or faulty portion with another and the upgrading of a version or the like can be easily performed.

Embodiment 5

The embodiment 4 has shown how the achievable distance up to and the direction toward the route, both detected by the route achievable distance detecting means 22, are displayed on the display means 16. However they may be notified to the user through a voice message.

Figure 19:
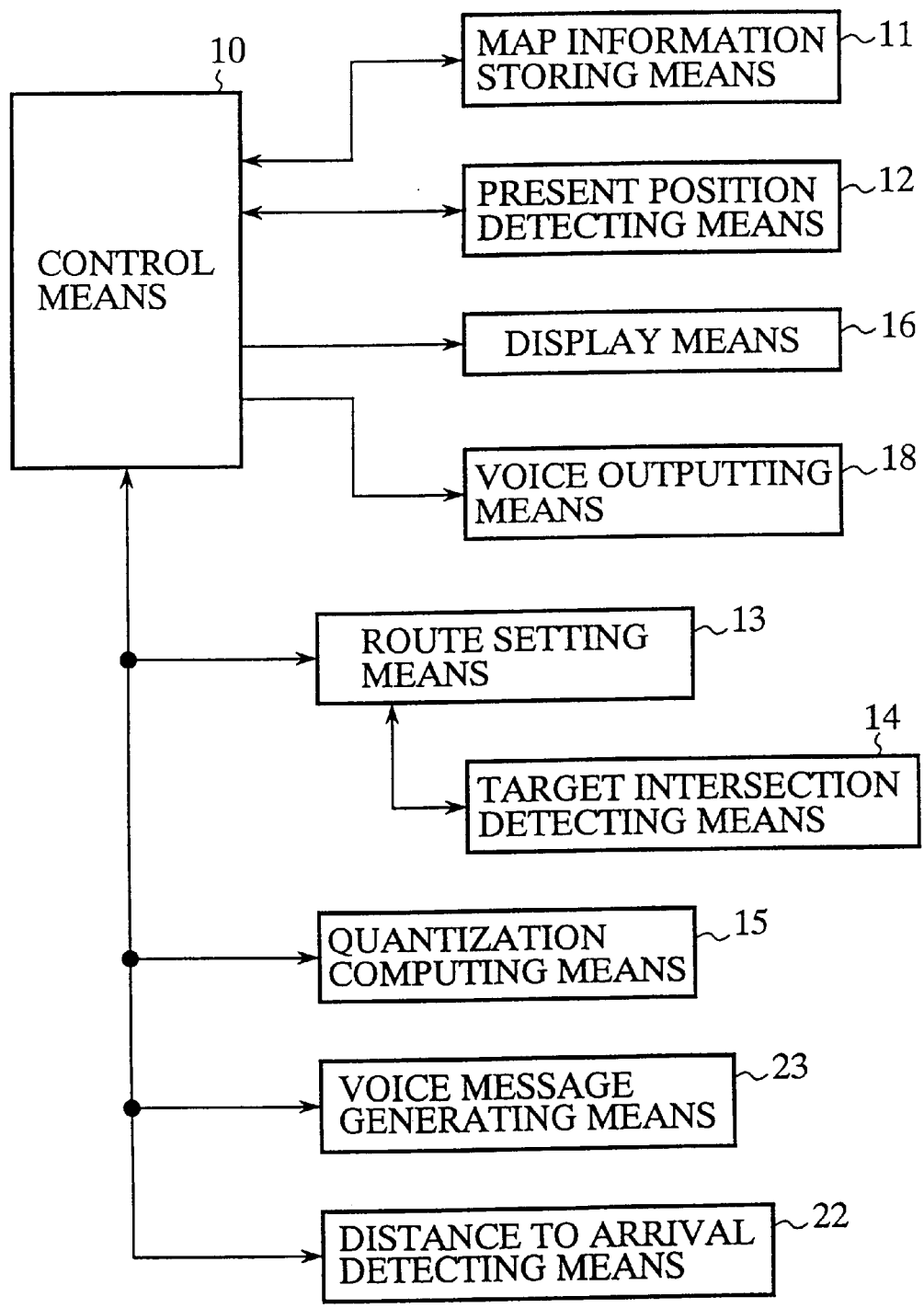
FIG. 19 is a block diagram depicting a functional configuration of a navigation system according to an embodiment 5 of the present invention.

FIG. 19 is a block diagram showing a functional configuration of a navigation system according to such an embodiment 5 of this invention. Parts corresponding to those employed in the embodiment 4 are identified by the same reference numerals as those in FIG. 16 and their descriptions will be omitted. In the drawing, reference numeral 23 indicates a voice message generating means. However, the voice information storing means incorporated in the voice message generating means stores words, phrases, etc. included in messages used to notify the distance up to and the direction toward a set route, etc. by voice therein as voice waveform data. Further, the present voice message generating means 23 is different from that designated by numeral 17 in FIG. 16 in that when the achievable distance up to the route and the direction toward the route are detected by a route achievable distance detecting means 22, the voice message generating means selects voice waveform data corresponding to the detected distance and direction and outputs it to voice outputting means 18.

FIG. 20 is an explanatory diagram showing one example of a partial message selected according to the direction of a route with respect to the traveling direction of a mobile body when the route achievable distance or the like is notified by the voice message generating means 23 through voice. In the drawing, reference numeral 431 indicates a route direction indicative of the direction of the route with respect to the traveling direction of the mobile body, and reference numeral 432 indicates a portion message corresponding to the route direction 431. FIG. 21 is an explanatory diagram showing one example of a guide message outputted from the voice message generating means 23 to the voice outputting means 18. In the drawing, reference numeral 433 indicates one example of a guide message for the notification of a route achievable distance created based on the portion message 432 or the like selected according to the direction of the route with respect to the traveling direction of the mobile body.

The operation will next be described.

Figure 22:
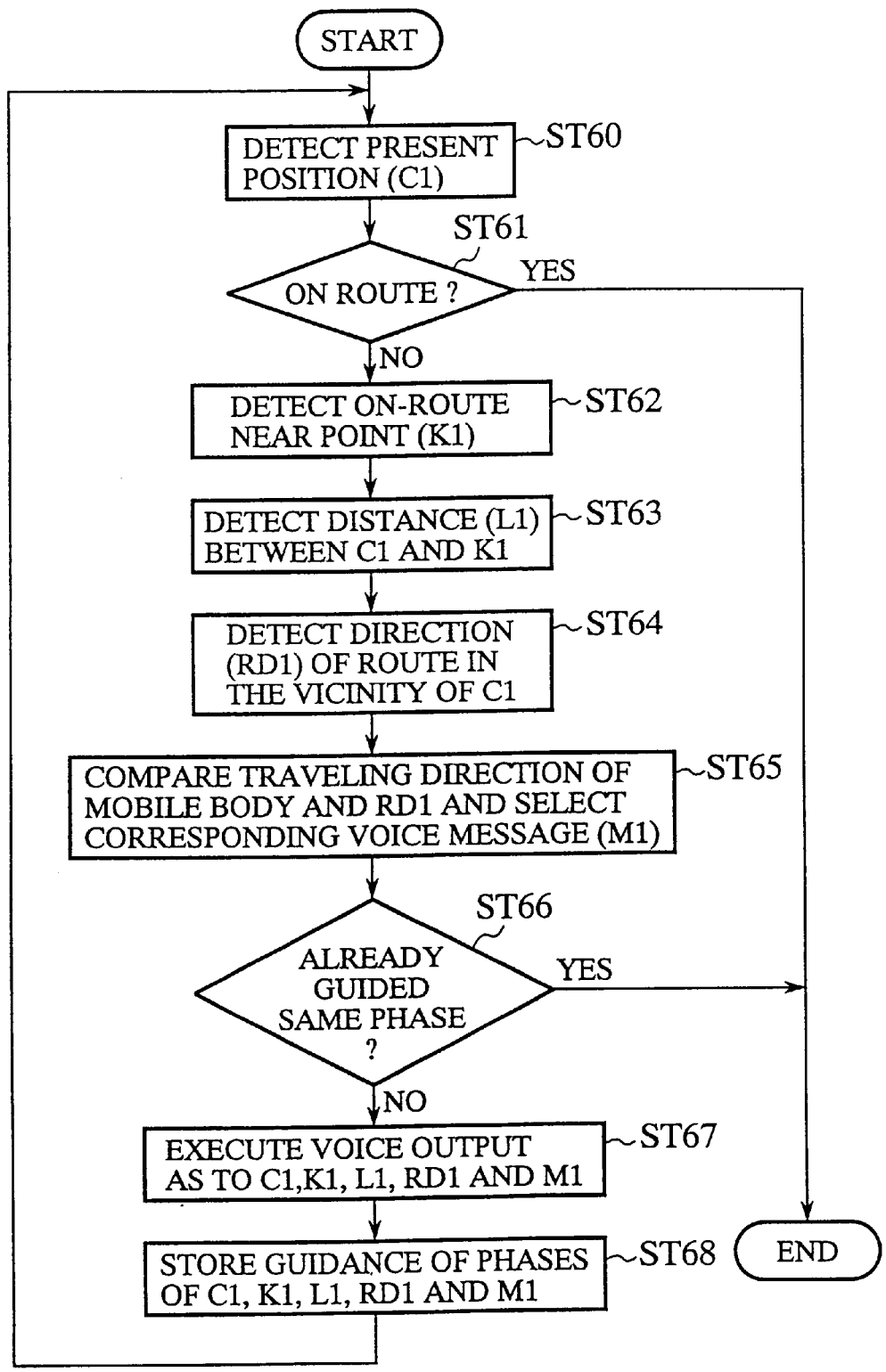
FIG. 22 is a flowchart showing the flow of the operation of the navigation system according to the embodiment 5 shown in FIG. 19.

Now, FIG. 22 is a flowchart showing the flow of processing of the navigation system according to the embodiment 5. In a manner similar to the embodiment 4, the present position (C1) of the mobile body is first detected by present position detecting means 12 in Step ST60. It is determined in Step ST61 whether the present position (C1) is placed on the present route. If the answer is found to be YES in Step ST61, then the procedural processing is terminated as it is. If the answer is found to be NO in Step ST61, then an on-route near point (K1) is detected in Step ST62. Further, the distance (L1) between the present position (C1) and the on-route near point (K1) is detected in Step ST63.

Thereafter, the direction (RD1) of a route lying in the neighborhood of the present position (C1) of the mobile body is detected from the present position (C1) of the mobile body in Step ST64. Next, the detected route direction (RD1) and the traveling direction of the mobile body are compared in Step ST65 and a corresponding voice message (M1) is selected from the portion message 432 shown in FIG. 20. Namely, if the route direction with respect to the traveling direction of the mobile body takes the traveling direction thereof, the opposite direction, the right direction and the left direction, then portion messages like "during parallel driving", "during reverse driving", "extend to the right" and "extend to the left" are respectively selected as voice messages (M1).

It is next determined in Step ST66 whether the same stage as that based on the present position (C1) of the mobile body, the on-route near point (K1), the distance (L1) therebetween, the route direction (RD1) in the vicinity of the present position of the mobile body, and the selected voice message (M1) is already guided. If the answer is found to be YES in Step ST66 from the result of determination, then the procedural processing is finished as it is. On the other hand, when the answer is found to be NO in Step ST66, the present position (C1), the on-route near point (K1), the distance (L1), the route direction (RD1) and the voice message (M1) are notified by voice in Step ST67. Namely, the guide message 433 indicative of, for example, "There is a route direction in a right rear position about 100 m away", "Route extends to the left at a position about 100 m ahead" and "Mobile body is parallel driving on the left side of the route over about 30 m" or the like is created based on the present position (C1), the on-route near point (K1), the distance (L1), the route direction (RD1) and the voice message (M1). The created guide message 433 is outputted from the voice outputting means 18.

Next, the guidance of the phase based on these present position (C1), on-route near point (K1), distance (L1), route direction (RD1) and voice message (M1) is stored in Step ST68. The above processes are subsequently repeated until the mobile body is on the route.

According to the embodiment 5 as described above, an effect is brought about in that since the direction in which the route exists and the distance to the route are notified by voice even when the present position of the mobile body is not placed on the route, the user can recognize without viewing a display screen, whether the mobile body can follow the route, depending on in which direction and how far the mobile body moves, and the user is able to perform safer driving without turning user's attention away from the road during driving.

The above description has shown the case in which the function of notifying the route achievable distance or the like by voice is added to the navigation system illustrated in the embodiment 4. However, it may be applied to another type of navigation system. In this case, an effect similar to that obtained in the embodiment 5 can be brought about.

Embodiment 6

In the embodiment 4, even if the user can recognize in which direction the route set by the route setting means 13 exists as viewed from the present position and at which distance the set route is located as seen from the present position where the present position is not placed on the set route, the road up to the route is not displayed. Thus it is difficult to recognize in which way the mobile body reaches the set route. The present embodiment 6 is one constructed so as to be capable of displaying even peripheral roads from the present position of the mobile body to the set route.

Figure 23:
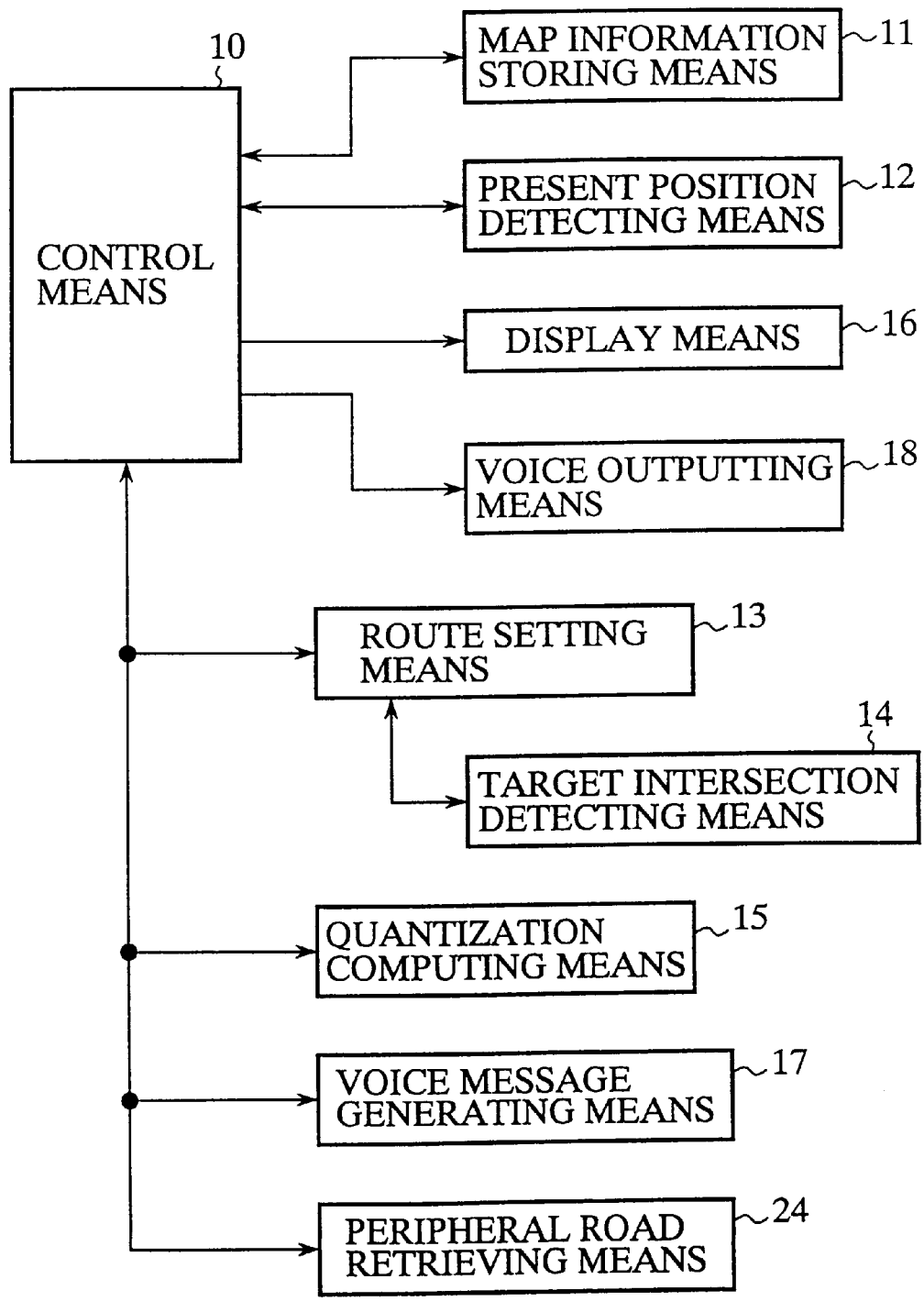
FIG. 23 is a block diagram illustrating a functional configuration of a navigation system according to an embodiment 6 of the present invention.

FIG. 23 is a block diagram showing a functional configuration of a navigation system according to such an embodiment 6 of the present invention. Parts corresponding to those employed in the embodiment 4 are identified by the same reference numerals as those shown in FIG. 16 and their descriptions will be omitted. In the drawing, reference numeral 24 indicates peripheral road retrieving means for retrieving a peripheral road for connecting the present position of a mobile body detected by present position detecting means 12 and a route set by route setting means 13 from map data stored in map information storing means 11.

Figure 24:
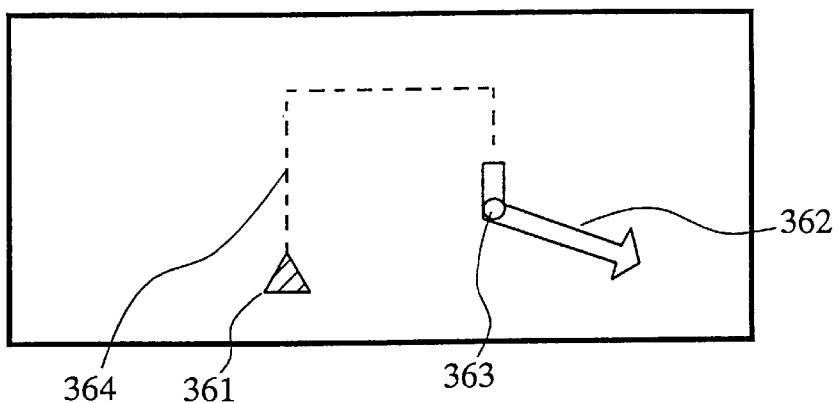
FIG. 24 is an explanatory diagram depicting one example of a peripheral road displayed on display means employed in the embodiment 6 shown in FIG. 23.

FIG. 24 is an explanatory diagram showing an example in which a peripheral road retrieved by the peripheral road retrieving means 24 is displayed on display means 16. In the drawing, reference numeral 361 indicates the present position of a mobile body, and reference numeral 362 indicates a route located in the vicinity of the present position 361 of the mobile body. Reference numeral 363 indicates an on-route near point indicative of a position nearest to the present position 351 of the mobile body on the route 352, and reference numeral 364 indicates a peripheral road extending from the present position 361 of the mobile body to the on-route near point 363.

The operation will next be described.

Figure 25:
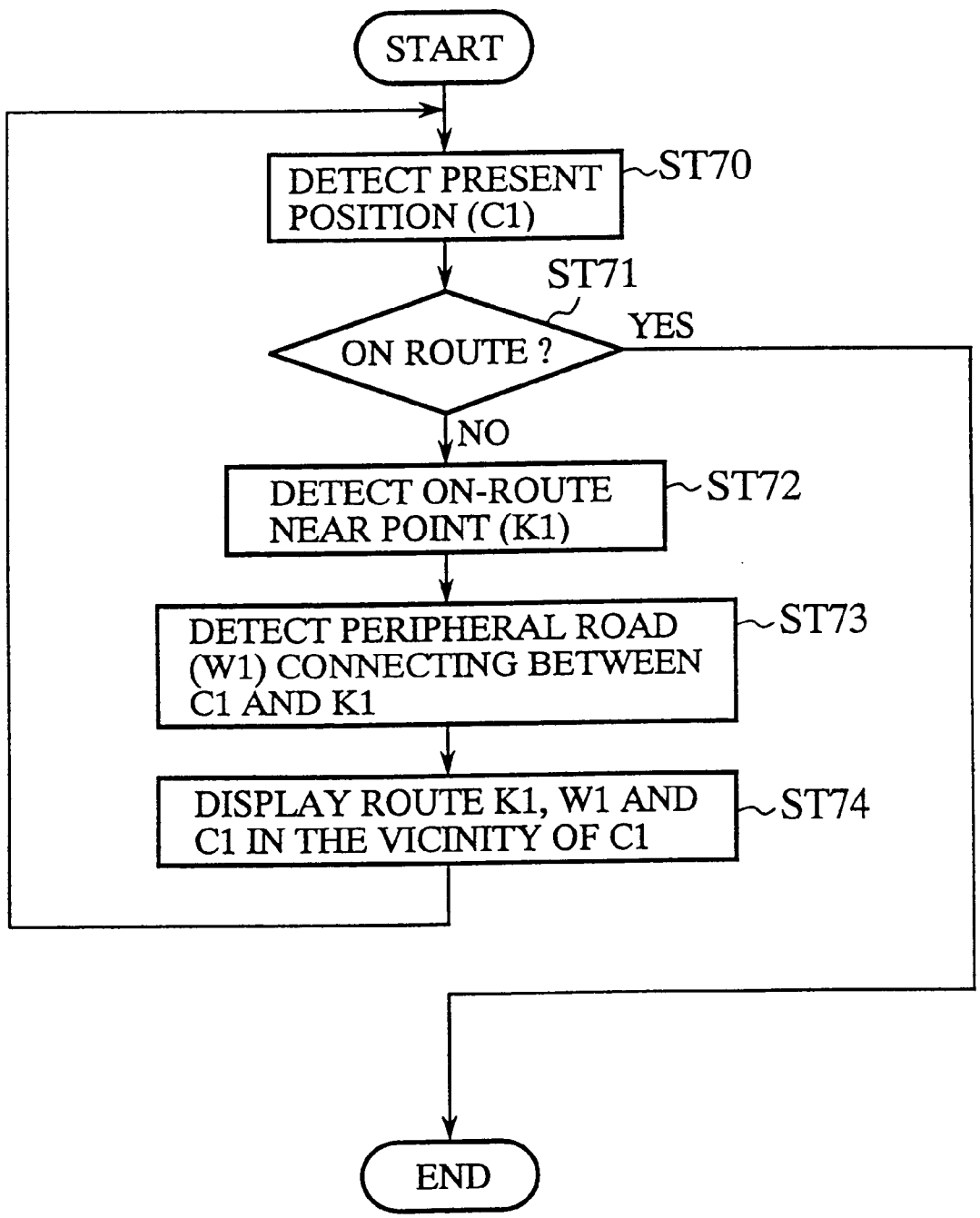
FIG. 25 is a flowchart illustrating the flow of the operation of the navigation system according to the embodiment 6 shown in FIG. 23.

Now, FIG. 25 is a flowchart showing the flow of processing of the navigation system according to the embodiment 6. In Step ST70, the present position (C1) of the mobile body is first detected by the present position detecting means 12. It is next determined in Step ST71 whether or not the detected present position (C1) is presently on the route set by the route setting means 13. If the answer is found to be YES in Step ST71, then the procedural processing is completed as it is. On the other hand, when the answer is found to be NO in Step ST71, the procedural processing proceeds to Step ST72 where an on-route near point (K1) nearest to the present position (C1) of the mobile body on the route is detected. Incidentally, the processes executed until here are similar to those employed in the embodiment 4.

Next, the procedural processing proceeds to Step ST73, where the peripheral road retrieving means 24 retrieves a peripheral road (W1) which connects between the detected present position (C1) of the mobile body and the on-route near point (K1) nearest to the present position (C1) of the mobile body on the route, based on the map data read from the map information storing means 11. Next, in Step ST74, the peripheral road 364 extending from the present position 361 to the on-route near point 363 is displayed on the display means 16 together with the present position 361 of the mobile body, the route 362 located in the vicinity of the present position 361 and the on-route near point 363 on the route 362 as shown in FIG. 24, based on the present position (C1), the on-route near point (K1) and the peripheral road (W1). Thereafter, the procedural processing is returned to Step ST70 from which the above-described processes are repeated until the present position of the mobile body is returned to the route.

Even in the case of the route 362 near the present position 361 of the mobile body and the peripheral road 364 upon displaying them on the display means 16, they are displayed by cutting the corresponding portion from the map data and quantizing the cut portion into simple arrow form or the like by the quantization computing means 15 in a manner similar to the embodiment 4.

According to the embodiment 6 as described above, an effect is brought about in that since the peripheral road extending from the present position to the set route is displayed in simple graphics form even when the mobile body is not on the set route, the user can easily recognize how the mobile body can reach the route even if no road map is displayed.

The above description has shown the case in which the function of displaying the peripheral road extending to the set route is added to the navigation system shown in the embodiment 1. However, it may be applied to another type of navigation system. In this case, an effect similar to that obtained in the embodiment 6 can be brought about.

Although the embodiment 6 is constructed assuming that the program used to retrieve the peripheral road extending from the present position to the set route would be stored in the ROM 62 in the control unit 58 in advance, all or some of the program is stored in an external storage medium such as a CD-ROM or the like and read from the external storage medium as needed by using a reproduction device, and the read program may be used for the retrieval of the peripheral road by the peripheral road retrieving means 24. Accordingly, the replacement of the program by another becomes easy, and the replacement of a faulty portion with another and the upgrading of a version or the like can be easily performed.

Embodiment 7

Since the road map is not displayed on the display means 16, the embodiment 1 has difficulties in recognizing where the mobile body is now running. The present embodiment 7 is constructed to display the already-known targets lying in the vicinity of the present position of the mobile body and to recognize an running outline as to where the mobile body is now running.

Figure 26:
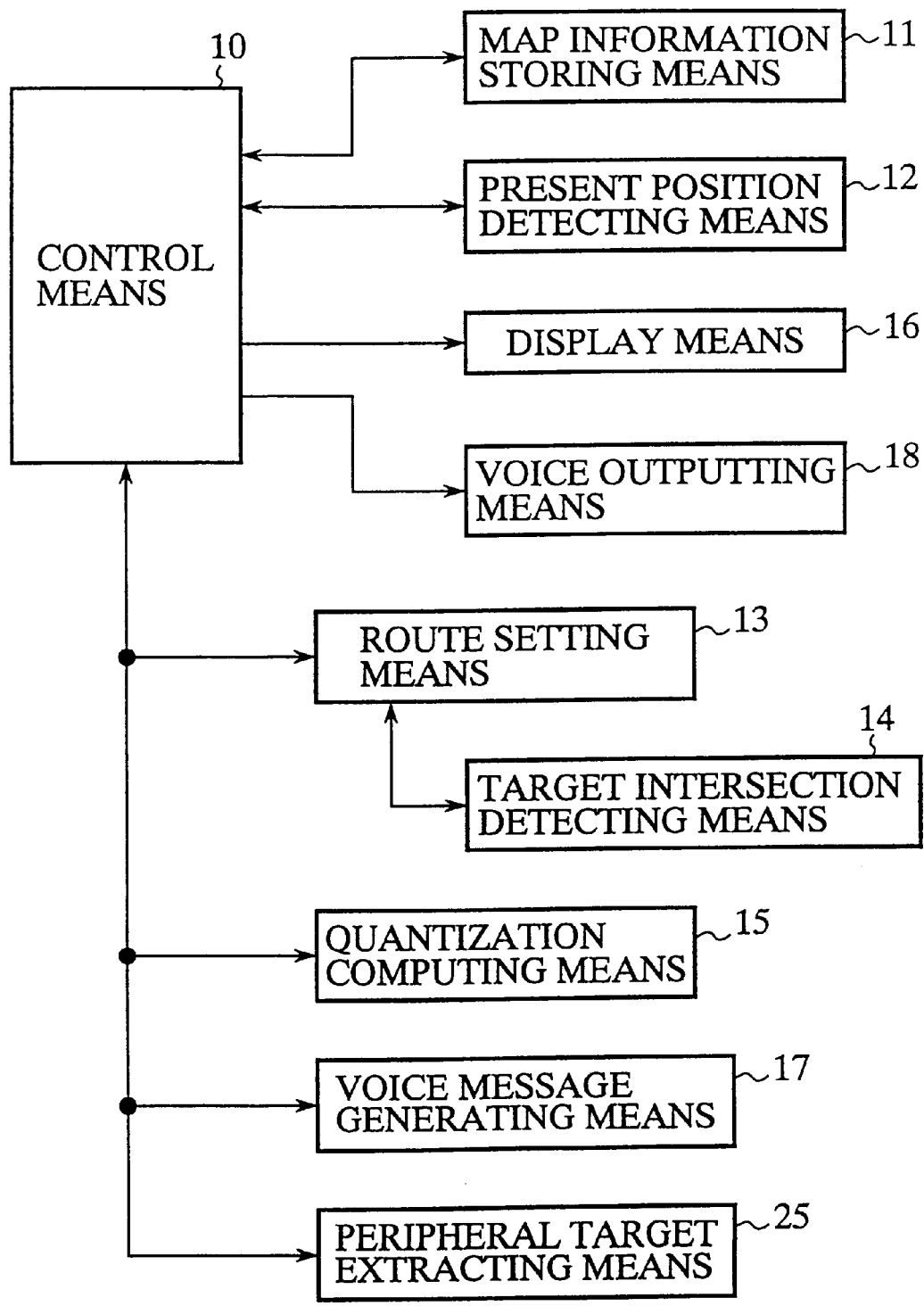
FIG. 26 is a block diagram showing a functional configuration of a navigation system according to an embodiment 7 of the present invention.

FIG. 26 is a block diagram showing a functional configuration of a navigation system according to such an embodiment 7 of the present invention. Parts corresponding to those illustrated in the embodiment 1 are identified by the same reference numerals as those in FIG. 2 and their descriptions will be omitted. In the drawing, reference numeral 25 indicates peripheral target extracting means for extracting the already-known targets such as large roads, famous roads, railway lines and prominent buildings, etc. located in the neighborhood of the present position of a mobile body from map data read from map information storing means 11 on the basis of the present position of the mobile body detected by present position detecting means 12.

Figure 27:
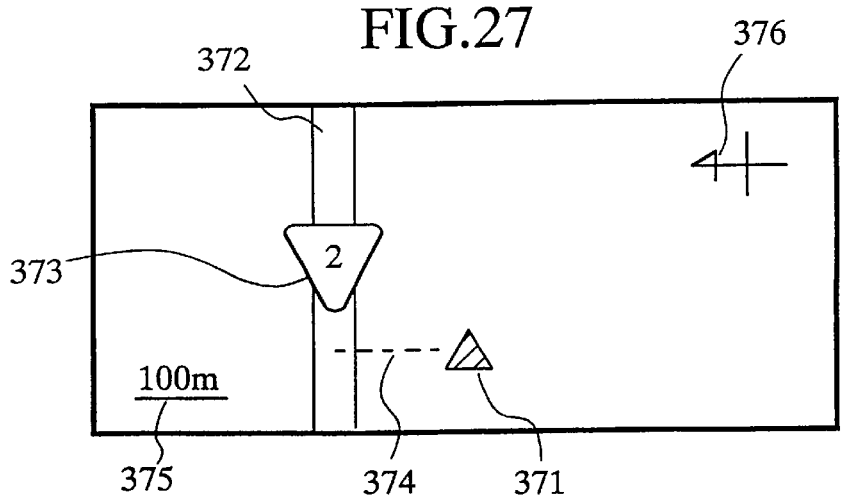
FIG. 27 is an explanatory diagram depicting one example of a peripheral road displayed on display means employed in the embodiment 7 shown in FIG. 26.

FIG. 27 is an explanatory diagram showing an example in which an already-known target located in the vicinity of the present position of the mobile body, which has been extracted by the peripheral target extracting means 25, is displayed on display means 16. In the drawing, reference numeral 371 indicates the present position of the mobile body, reference numeral 372 indicates a large road defined as an already-known target located in the neighborhood of the present position 371 of the mobile body, and reference numeral 373 indicates the number of the road 372, which is defined as a target name. Reference numeral 374 indicates a straight line indicative of the relationship of the distance between the present position 371 of the mobile body and the road 372, reference numeral 375 indicates a distance given in the straight line 374, and reference numeral 376 indicates a bearing symbol.

The operation will next be described.

Figure 28:
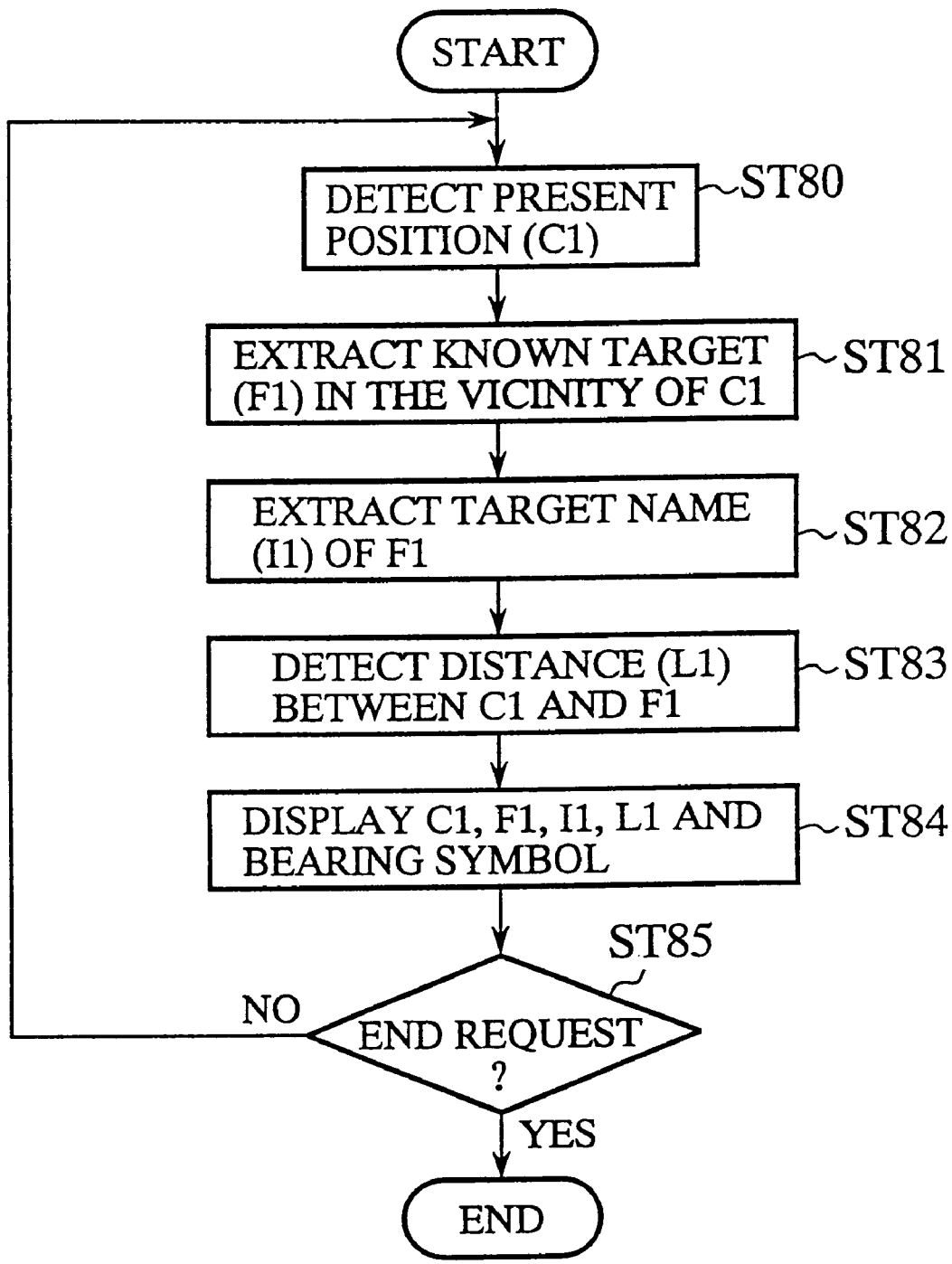
FIG. 28 is a flowchart showing the flow of the operation of the navigation system according to the embodiment 7 shown in FIG. 26.

Now, FIG. 28 is a flowchart showing the flow of processing of the navigation system according to the embodiment 7. In Step ST80, the present position (C1) of the mobile body is first detected by the present position detecting means 12. Next, in Step ST81, the peripheral target extracting means 25 extracts an already-known target (F1) such as a large road, a famous road, a railway line, a prominent building or the like located in the neighborhood (lying in a range of within a radius of 300 m as the circumference of the present position (C1) of the mobile body, for example) of the present position of the mobile body from the map data read from the map information storing means 11 on the basis of the detected present position of mobile body. Examples of the large and famous roads are national roads whose numbers are given by one digit and trunks of local roads. Examples of famous buildings is a prominent one like the Tokyo tower. Next, a target name (I1) such as a road name, a road number, a route name, a building name or the like, of the extracted already-known target (F1) such as a large road, famous road, railway line, prominent building or the like is extracted in Step ST82.

Thereafter, the procedural processing proceeds to Step ST83 where the distance (L1) between the present position (C1) of the mobile body and the extracted already-known target (F1) is detected. Next, in Step ST84, the present position 371 of the mobile body, the large road 372 defined as the already-known target located in the neighborhood of the present position 371 of the mobile body, the road number 373 of the large road 372 defined as the target name, the straight line 374 indicative of the relationship of the distance between the present position 371 of the mobile body, the large road 372, and the distance 375 between the two, which is given in the straight line 374. The above are displayed on the display means 16 together with the bearing symbol 376 as shown in FIG. 27, based on the detected present position (C1) of mobile body and the extracted already-known target (F1) such as a large road, famous road, railway line, prominent building or the like, and the target name (I1) of the corresponding already-known target (F1). Thereafter, the procedural processing is returned to Step ST80 and the above-described processes are repeated until a processing end request is made.

According to the embodiment 7 as described above, an effect can be brought about in that since the known target such as a large road, famous road, railway line, prominent building or the like which are close to the present position is displayed on the screen when the present position of the running mobile body is unknown, the present position of the mobile body can be recognized as a relative position from the known target.

The above description has shown the case in which the function of displaying the known target is added to the navigation system shown in the embodiment 1. However, it may be applied to another type of navigation system. In this case, an effect similar to that obtained in the embodiment 7 can be brought about.

Although the embodiment 7 is constructed assuming that the program used to extract the peripherally-existing known target would be stored in the ROM 62 in the control unit 58 in advance, all or some of the program is stored in an external storage medium such as a CD-ROM or the like and read from the external storage medium as needed by using a reproduction device. The read program may be used for the extraction of the known target by the peripheral target extracting means 25. Accordingly, the replacement of the program by another becomes easy, and the replacement of a faulty portion with another and the upgrading of a version or the like can be easily performed.

Embodiment 8

The embodiment 7 has shown how the already-known targets lying in the vicinity of the mobile body, which have been extracted by the peripheral target extracting means 25, are displayed on the display means 16. However, a user may be notified about them through a guide message.

Figure 29:
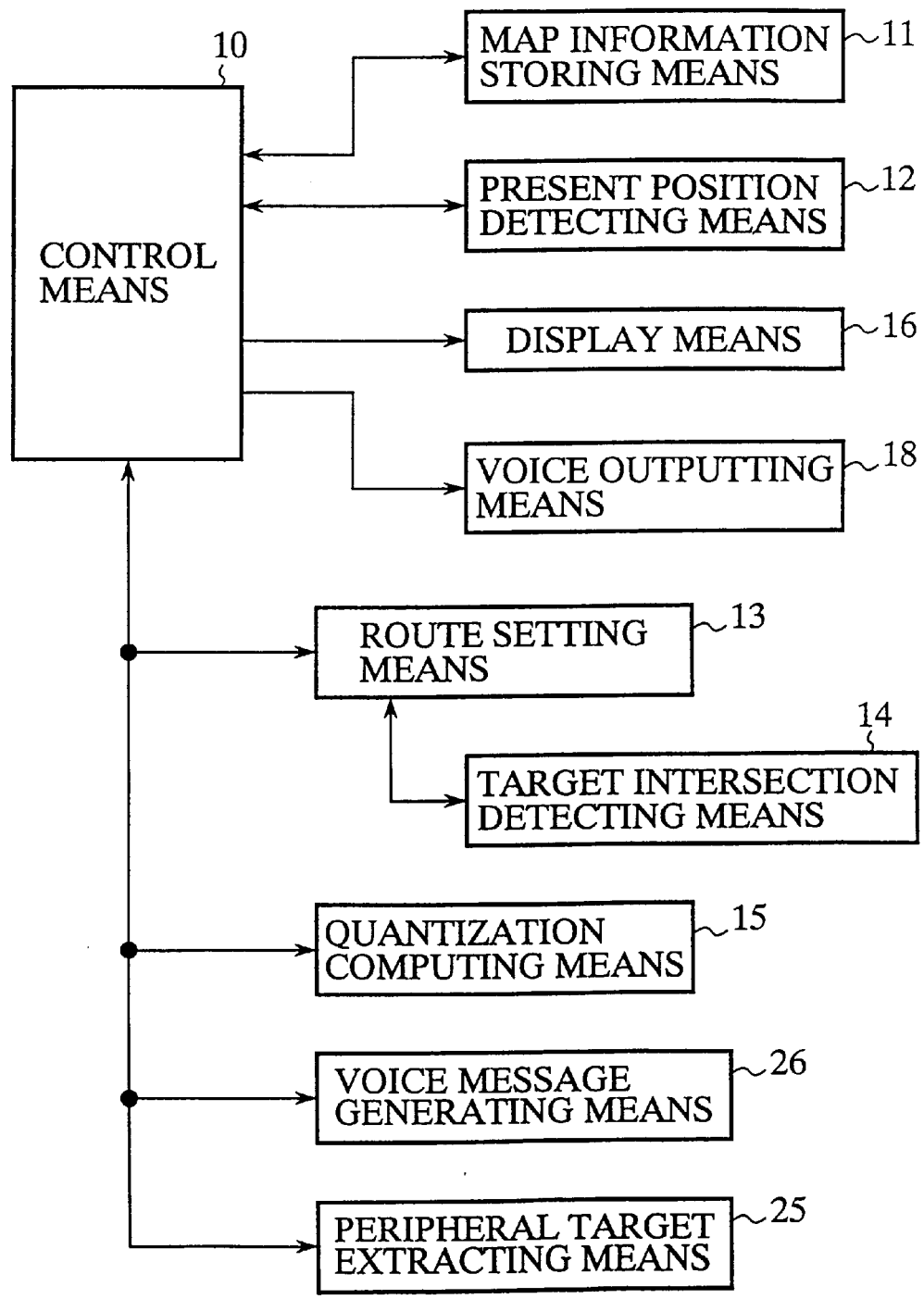
FIG. 29 is a block diagram illustrating a functional configuration of a navigation system according to an embodiment 8 of the present invention.

FIG. 29 is a block diagram showing a functional configuration of a navigation system according to such an embodiment 8 of this invention. Parts corresponding to those shown in the embodiment 7 are identified by the same reference numerals and their description will be omitted. In the drawing, reference numeral 26 indicates voice message generating means. A voice information storing means incorporated in the voice message generating means 26 stores words, phrases, etc. which are included in messages used to notify the distance up to and the direction toward each known target, etc. by voice therein as voice waveform data. Further, the present voice message generating means is different from that designated at numeral 17 in FIG. 26 in that when the known targets such as a large road, famous road, railway line, prominent building, etc. lying in the vicinity of the mobile body are extracted by the peripheral target extracting means 25, the voice message generating means selects voice waveform data corresponding to the detected known targets and outputs same to the voice outputting means 18.

FIG. 30 is an explanatory diagram showing one example of a guide message outputted from the voice message generating means 25 to the voice outputting means 18. In the drawing, reference numeral 441 indicates one example of a guide message for guiding the known targets such as a large road, famous road, railway line, prominent building, etc. located in the neighborhood of the mobile body.

The operation will next be described.

Figure 31:
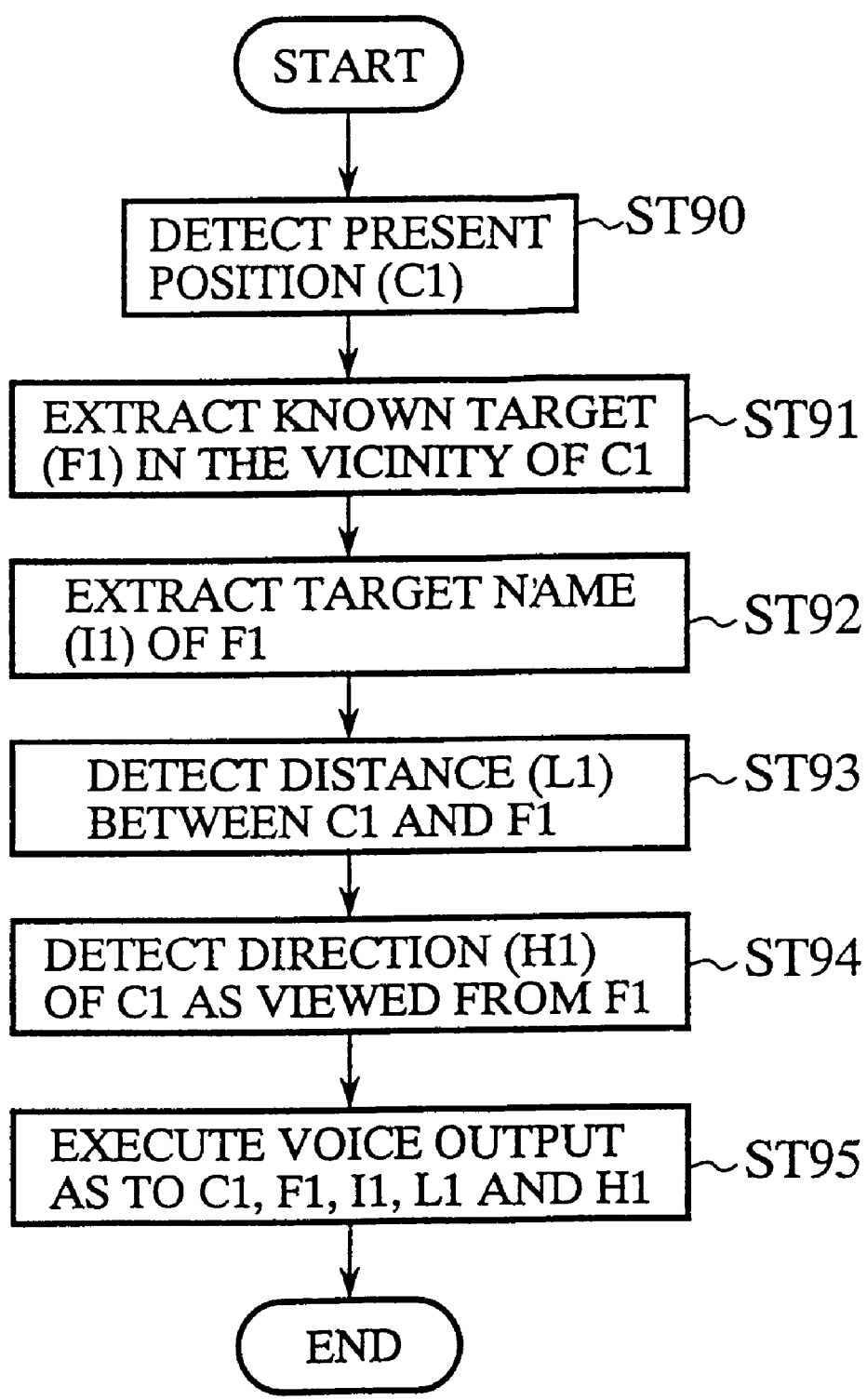
FIG. 31 is a flowchart depicting the flow of the operation of the navigation system according to the embodiment 8 shown in FIG. 29.

Now, FIG. 31 is a flowchart showing the flow of processing of a navigation system according to this embodiment 8. In Step ST90, the present position (C1) of the mobile body is first detected by present position detecting means 12. In Step ST91, map data in the neighborhood of the present position (C1) is retrieved and the already-known target (F1) such as a large road, famous road, railway line, prominent building or the like is extracted from the map data. Next, the target name (I1) of the known target (F1) is extracted in Step ST92. The distance (L1) between the present position (C1) of the mobile body and the known target (F1) is detected in Step ST93. Incidentally, the processes up to this point are similar to those employed in the embodiment 7.

Next, the direction (H1) of the present position (C1) of the mobile body as viewed from the known target (F1) is detected based on the map data read from map information storing means 11 in Step ST94. Further, voice notification about the present position (C1), the known target (F1), the target name (I1) thereof, the distance (L1) and the direction (H1) is performed in Step ST95. A guide message 441 indicative of "mobile body is being parallel-driven to the east at a position located 100 m south of National Road No. 2", "mobile body is advancing southward at a position located 300 m north of Wangan Line No. 5 of Hanshin Highway", "mobile body is running to the eastward along a road just under Hankyu-Kobe Line" and "mobile body is placed in a position located 50 m south of Tokyo Tower" such as shown in FIG. 30 by way of example is created in Step ST95. The created guide message 441 is outputted from the voice outputting means 18.

According to the embodiment 8 as described above, an effect can be brought about in that since the user is notified by voice of the already-known targets such as a large road, famous road, railway line, prominent buildings, etc. lying in the neighborhood of the mobile body when the position at which the mobile body is now running, is unknown, the present position of the mobile body can be understood as a relative position from each target without viewing the display screen. Hence the user is able to perform safer driving without turning user's attention away from the road during driving.

Incidentally, the above description has shown the case in which the function of notifying the surrounding known targets by voice is added to the navigation system illustrated in the embodiment 7. However, it may be applied to another type of navigation system. In this case, an effect similar to that obtained in the embodiment 8 is brought about.

INDUSTRIAL APPLICABILITY

As has been described above, the navigation system according to this invention is useful as it makes it possible to display a route in simple graphics such as arrows without the display of a map screen including information that the system does not necessarily require for actual driving. Furthermore stepwise change of the displayed contents according to the distance to a target intersection is displayed, so as to allow a user to easily recognize necessary action to take at the target intersection. Thereby a reduction in load for recognizing the displayed contents is created. The present navigation system is also useful as one wherein a guide message about a route is notified to the user by voice so that the user can perform safer driving without turning user's attention away from the road during driving. Further, the present navigation system is useful for recognizing the contents of a set route without displaying a map screen. Moreover, the present navigation system is useful for easily recognizing, without the display of a map screen when a mobile body does not move along a set route, whether the mobile body can reach the set route, depending on in which direction and at what distance the mobile body proceeds or it can reach the route depending on what peripheral road the mobile body traces. The present navigation system is still further useful for confirming the present position of a mobile body as a relative position as viewed from a surrounding known target without the display of a map screen when the present position of the mobile body is unknown.

What is claimed is:

1. A navigation system comprising:

map information storing means storing map data including road data and intersection data;

route setting means for setting a route between two points on the map data stored in said map information storing means;

present position detecting means for detecting a present position of a mobile body;

quantization computing means for generating by computation simple graphics indicating the route set by said route setting means;

target intersection detecting means for detecting a target intersection on the route set by said route setting means; and display means for displaying the simple graphics computed by said quantization computing means on the basis of a distance relationship between the target intersection detected by said target intersection detecting means and the present position detected by said present position detecting means, wherein when the distance relationship is greater than a first predetermined value, a first graphic output is displayed, and when the distance relationship is less than the first predetermined value but larger than a second predetermined value, a second graphic output is displayed, and when the distance relationship is less than the second predetermined value, a third graphic output is displayed.

2. The navigation apparatus according to claim 1, further comprising:

voice message generating means which has a voice information storing means storing voice waveform data, comprising at least one of: words and phrases to produce a guide message used to guide a driver of said mobile body along the route, and which reads voice waveform data from said voice information storing means to thereby generate a guide message when the simple graphics computed by said quantization computing means is displayed on said display means based on the distance relationship between the target intersection and the present position of the mobile body; and voice outputting means for audibly notifying the guide message generated by said message generating means.

3. The navigation apparatus according to claim 1, wherein a program for performing a quantization computation is stored on an external storage medium and said quantization computing means generates the simple graphics, based on the program read from said external storage medium.

4. The navigation system according to claim 1, wherein said first through third graphic outputs include progressively more information as guiding information.

5. A navigation system comprising:

map information storing means storing map data including road data and intersection data;

route setting means for setting a route between a starting point and a final destination point based on the map data stored in said map information storing means;

present position detecting means for detecting a present position of a mobile body;

target intersection detecting means for detecting a target intersection on the route set by said route setting means;

general route generating means for arranging information about respective names of said target intersections on the route set by said route setting means and roads lying therebetween in list form, on the basis of the route set by said route setting means to thereby generate a composite route description from said starting point to said final destination point; and display means for displaying the general route generated by said general route generating means.

6. The navigation system according to claim 5, wherein a program for generating the general route is stored on an external storage medium and said general route generating means performs a process for generating the general route, based on the program read from said external storage medium.

7. The navigation system according to claim 5, further including selecting means to select a subset of the route set by said route setting means based on a selected range of target intersections including a first subpoint and a second subpoint, and wherein said general route generating means generates a sectional route description from said first subpoint to said second subpoint.

8. A navigation system comprising:

map information storing means storing map data including road data and intersection data;

route setting means for setting a route between a starting point and a final destination point based on the map data stored in said map information storing means;

present position detecting means for detecting a present position of a mobile body;

target intersection detecting means for detecting a target intersection on the route set by said route setting means;

general route generating means for arranging information about respective names of said target intersections on the route set by said route setting means and roads lying therebetween in list form, on the basis of the route set by said route setting means to thereby generate a composite route description from said starting point to said final destination point;

voice message generating means for generating a guide message for notifying the general route generated by said general route generating means by voice; and voice outputting means for audibly notifying the guide message generated by said voice message generating means.

9. The navigation system according to claim 8, further including selecting means to select a subset of the route set by said route setting means based on a selected range of target intersections including a first subpoint and a second subpoint, and wherein said general route generating means generates a sectional route description from said first subpoint to said second subpoint, and wherein said voice message generating means is further operable to output the guide message according to the sectional route description.

10. A navigation system comprising:

map information storing means storing therein map data including road data and intersection data;

route setting means for setting a route between two points on the map data stored in said map information storing means;

present position detecting means for detecting the present position of a mobile body;

quantization computing means for generating by computation simple graphics indicating the route set by said route setting means;

route achievable distance detecting means for detecting the route set by said route setting means and for detecting an achievable distance between the present position of the mobile body detected by said present position detecting means and said route; and display means for displaying thereon the achievable distance to the route, which is detected by said route achievable distance detecting means, together with the present position of the mobile body, which is detected by said present position detecting means and for displaying the simple graphics generated by said quantization computing means indicating the route set by said route setting means, which route is located in the vicinity of the present position of the mobile body.

11. The navigation system according to claim 10, wherein a program for detecting the achievable distance to the route is stored on an external storage medium and said route achievable distance detecting means executes a process for detecting the achievable distance between the present position and the route, based on the program read from said external storage medium.

12. The navigation apparatus according to claim 7, wherein the route achievable distance detecting means detects a minimum linear distance between the present position of the mobile body and said route.

13. A navigation system comprising:

map information storing means storing map data including road data and intersection data;

route setting means for setting a route between two points on the map data stored in said map information storing means;

present position detecting means for detecting a present position of a mobile body;

route achievable distance detecting means for detecting the route set by said route setting means and a minimum linear distance between the present position of the mobile body detected by said present position detecting means and said route;

voice message generating means for generating a guide message for performing voice notification including the minimum linear distance up to the route, which is detected by said route achievable distance detecting means; and voice outputting means for notifying the guide message generated by said voice message generating means by voice.

14. A navigation system comprising:

map information storing means storing therein map data including road data and intersection data;

route setting means for setting a route between two points on the map data stored in said map information storing means;

present position detecting means for detecting the present position of a mobile body;

quantization computing means for generating by computation simple graphics indicating the route set by said route setting means;

peripheral road retrieving means for retrieving a connection to a peripheral road between the present position of the mobile body detected by said present position detecting means based on the route set by said route setting means and a corresponding route for the peripheral road from the map data stored in said map information storing means; and display means for displaying the peripheral road retrieved by said peripheral road display means together with the present position of the mobile body detected by said present position detecting means and the simple graphics generated by said quantization computing means, indicating the route set by said route setting means, which route is located in the vicinity of the present position of the mobile body.

15. The navigation apparatus according to claim 14, wherein a program for detecting the peripheral road up to the route set by said route setting means is stored on an external storage medium and said peripheral road retrieving means executes a process for retrieving the peripheral road extending from the present position to the route, based on the program read from said external storage medium.

16. A navigation system comprising:

map information storing means storing therein map data including road data and intersection data;

route setting means for setting a route between two points on the map data stored in said map information storing means;

present position detecting means for detecting the present position of a mobile body;

quantization computing means for generating by computation simple graphics indicating the route set by said route setting means;

peripheral target extracting means for extracting already-known target existing around the present position of the mobile body detected by said present position detecting means, based on the map data stored in said map information storing means; and display means for displaying the known target extracted by said peripheral target extracting means together with the present position detected by said present position detecting means and the simple graphics generated by said quantization computing means indicating the route set by said route setting means.

17. The navigation system according to claim 16, wherein a program for extracting the known target is stored on an external storage medium and said peripheral target extracting means executes a process for retrieving the known target lying around the present position, based on the program read from said external storage medium.

18. A navigation system comprising:

map information storing means storing therein map data including road data and intersection data;

route setting means for setting a route between two points on the map data stored in said map information storing means;

present position detecting means for detecting the present position of a mobile body;

quantization computing means for quantizing the route set by said route setting means into simple graphics;

route achievable distance detecting means for detecting the route set by said route setting means and for detecting an achievable distance between the present position of the mobile body detected by said present position detecting means and said route; and display means for displaying thereon the achievable distance to the route, which is detected by said route achievable distance detecting means, together with the present position of the mobile body, which is detected by said present position detecting means and for displaying the route which is located in the vicinity of the present position of the mobile body and which is quantized by said quantization computing means;

wherein the route available detecting means detects a minimum linear distance between the present position of the mobile body and said route.

\* \* \* \* \*